(12) United States Patent
Hosek et al.

(10) Patent No.: US 10,655,658 B2
(45) Date of Patent: May 19, 2020

(54) MATERIAL HANDLING SYSTEM

(71) Applicant: Persimmon Technologies, Corp., Wakefield, MA (US)

(72) Inventors: Martin Hosek, Lowell, MA (US); Sripati Sah, Wakefield, MA (US)

(73) Assignee: Persimmon Technologies, Corp., Wakefield, MA (US)

( * ) Notice: Subject to any disclaimer, the term of this patent is extended or adjusted under 35 U.S.C. 154(b) by 410 days.

(21) Appl. No.: 15/410,196

(22) Filed: Jan. 19, 2017

(65) Prior Publication Data

US 2017/0203898 A1 Jul. 20, 2017

Related U.S. Application Data

(60) Provisional application No. 62/280,788, filed on Jan. 20, 2016.

(51) Int. Cl.
| | |
|---|---|
| B25J 15/06 | (2006.01) |
| B25J 11/00 | (2006.01) |
| B25J 15/00 | (2006.01) |
| B25J 15/02 | (2006.01) |
| B25J 15/10 | (2006.01) |
| F16B 2/10 | (2006.01) |
| F16B 2/18 | (2006.01) |

(52) U.S. Cl.
CPC ............ *F16B 2/10* (2013.01); *B25J 11/0095* (2013.01); *B25J 15/0004* (2013.01); *B25J 15/0014* (2013.01); *B25J 15/0061* (2013.01); *B25J 15/0206* (2013.01); *B25J 15/0616* (2013.01); *B25J 15/0625* (2013.01); *B25J 15/10* (2013.01); *F16B 2/18* (2013.01)

(58) Field of Classification Search
CPC .... B25J 11/0095; B25J 15/00; B25J 15/0014; B25J 15/0052; B25J 15/0085; B25J 15/06; B25J 15/0616; B25B 11/005; H01L 21/683; H01L 21/6838; H01L 21/687; H01L 21/68728; H01L 21/68771; H01L 21/68778; B23Q 3/061; B23Q 3/084; B23Q 3/088
See application file for complete search history.

(56) References Cited

U.S. PATENT DOCUMENTS

| | | | | |
|---|---|---|---|---|
| 4,088,312 | A * | 5/1978 | Frosch | B23Q 1/035 269/21 |
| 4,491,306 | A * | 1/1985 | Eickhorst | B23Q 1/76 269/21 |
| 4,640,501 | A * | 2/1987 | Poland | B23Q 1/032 269/21 |
| 5,364,083 | A * | 11/1994 | Ross | B23Q 1/035 269/21 |
| 5,410,206 | A * | 4/1995 | Luecke | H02N 2/101 310/317 |
| 5,785,307 | A * | 7/1998 | Chung | H05K 13/0069 269/254 CS |

(Continued)

*Primary Examiner* — Tyrone V Hall, Jr.
(74) *Attorney, Agent, or Firm* — Harrington & Smith

(57) ABSTRACT

An apparatus has a frame and a plurality of clamps connected to the frame. At least one of the clamps is movable to releasably clamp a sheet of material on the apparatus. The plurality of clamps are configured and located on the frame to be limited to clamp on the sheet of material at least two edges of the sheet of material.

23 Claims, 24 Drawing Sheets

FRONT VIEW

SIDE VIEW

(56) References Cited

U.S. PATENT DOCUMENTS

| | | | | |
|---|---|---|---|---|
| 5,918,362 | A * | 7/1999 | Yamashita | H05K 13/0069 269/21 |
| 6,082,547 | A * | 7/2000 | Nentl | H01L 21/67333 206/724 |
| 7,416,176 | B2 * | 8/2008 | Hamann | B25B 11/005 269/21 |
| 8,465,072 | B2 * | 6/2013 | Wu | B65G 49/067 294/213 |
| 8,676,370 | B2 * | 3/2014 | Lambert | H05K 13/022 198/867.12 |
| 9,004,564 | B2 * | 4/2015 | Pergande | B25J 15/0014 294/213 |
| 9,061,423 | B2 * | 6/2015 | Pergande | B25J 15/0014 |
| 2005/0072714 | A1 * | 4/2005 | Eleveld | H01L 21/67333 206/701 |
| 2005/0211867 | A1 * | 9/2005 | Margeson | H01L 21/68728 248/550 |
| 2011/0108742 | A1 * | 5/2011 | Weaver | H01L 21/67742 250/492.21 |

\* cited by examiner

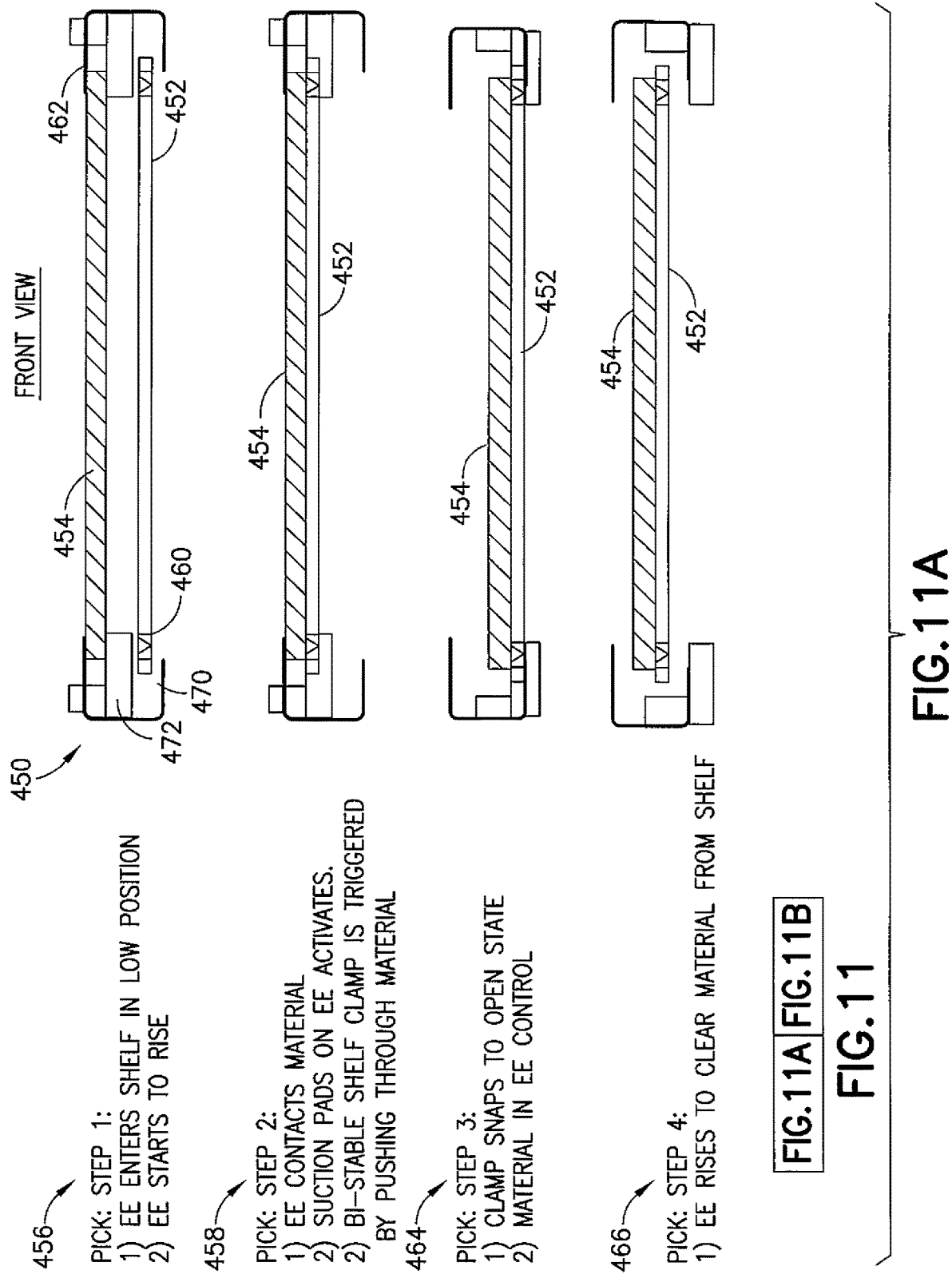

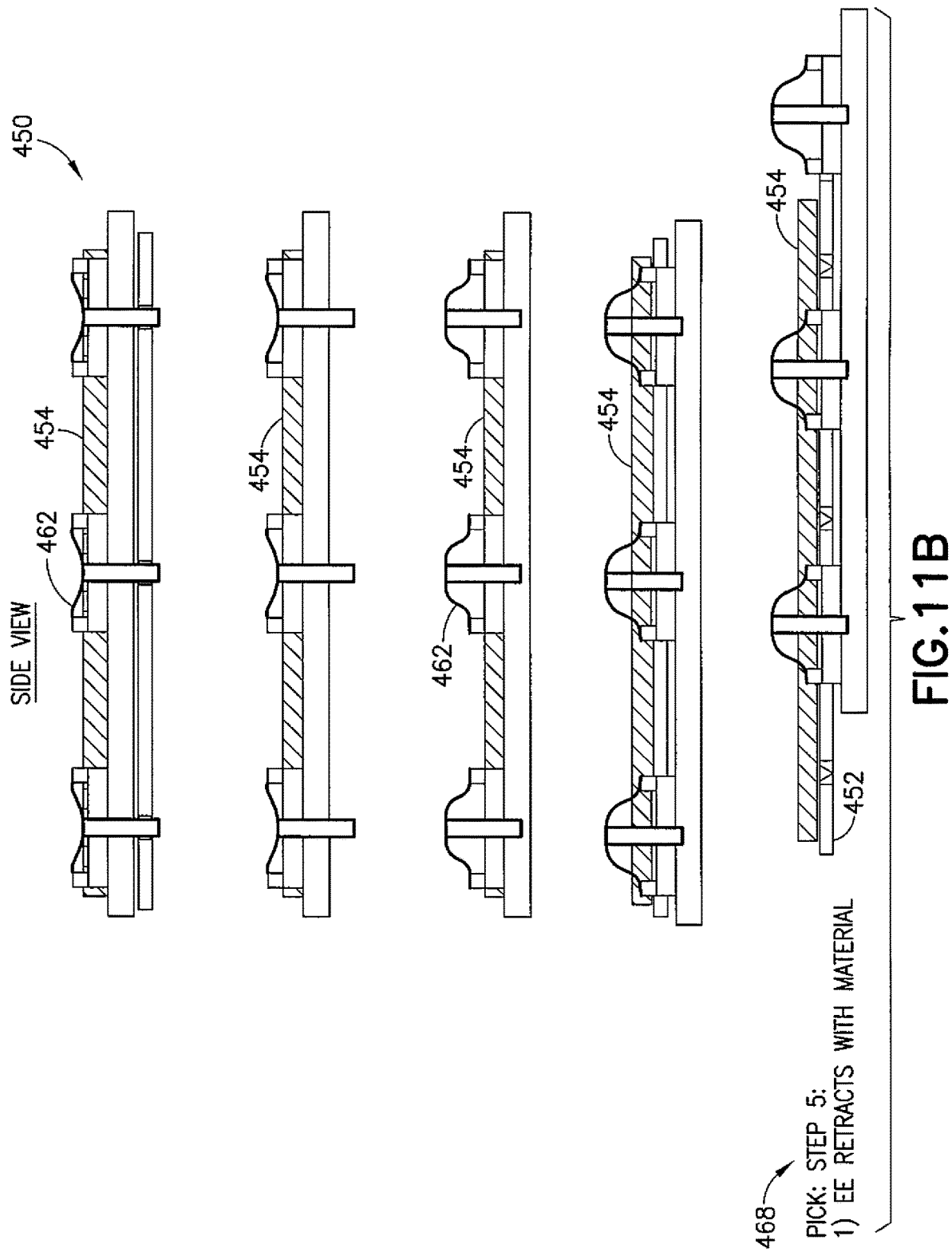

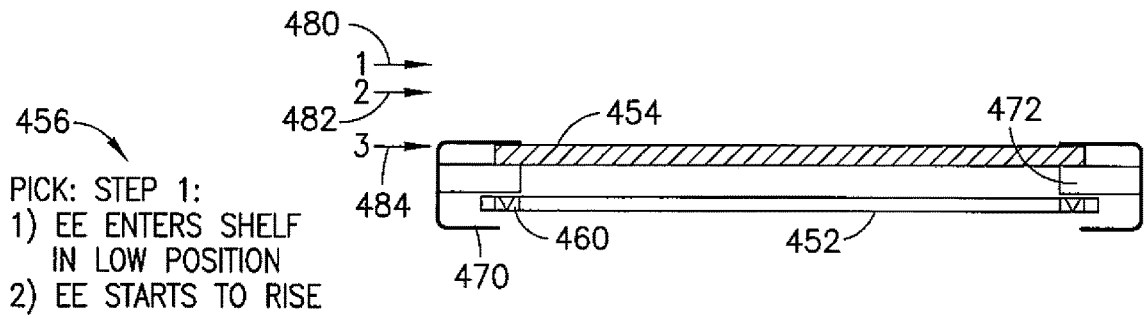
456
PICK: STEP 1:
1) EE ENTERS SHELF IN LOW POSITION
2) EE STARTS TO RISE
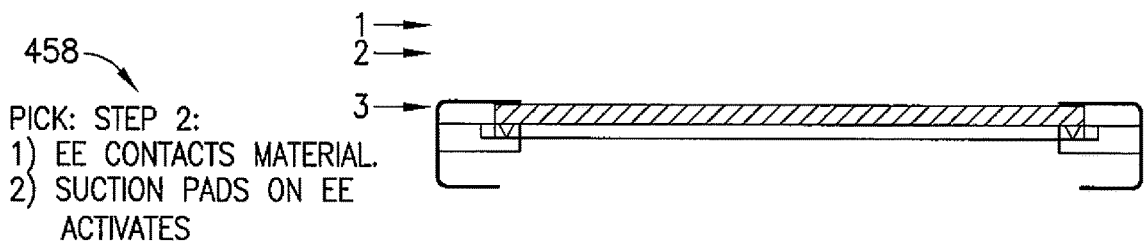
458
PICK: STEP 2:
1) EE CONTACTS MATERIAL.
2) SUCTION PADS ON EE ACTIVATES
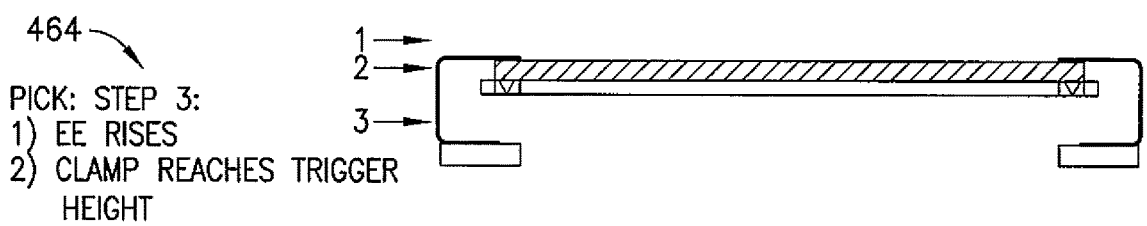
464
PICK: STEP 3:
1) EE RISES
2) CLAMP REACHES TRIGGER HEIGHT
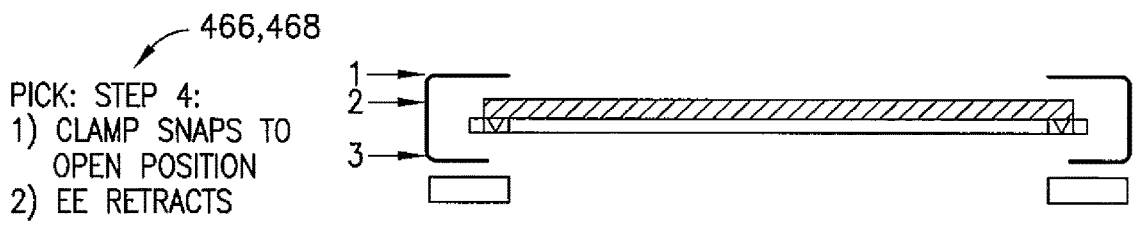
466, 468
PICK: STEP 4:
1) CLAMP SNAPS TO OPEN POSITION
2) EE RETRACTS
| FIG.12A | FIG.12B |
FIG.12
FIG.12A

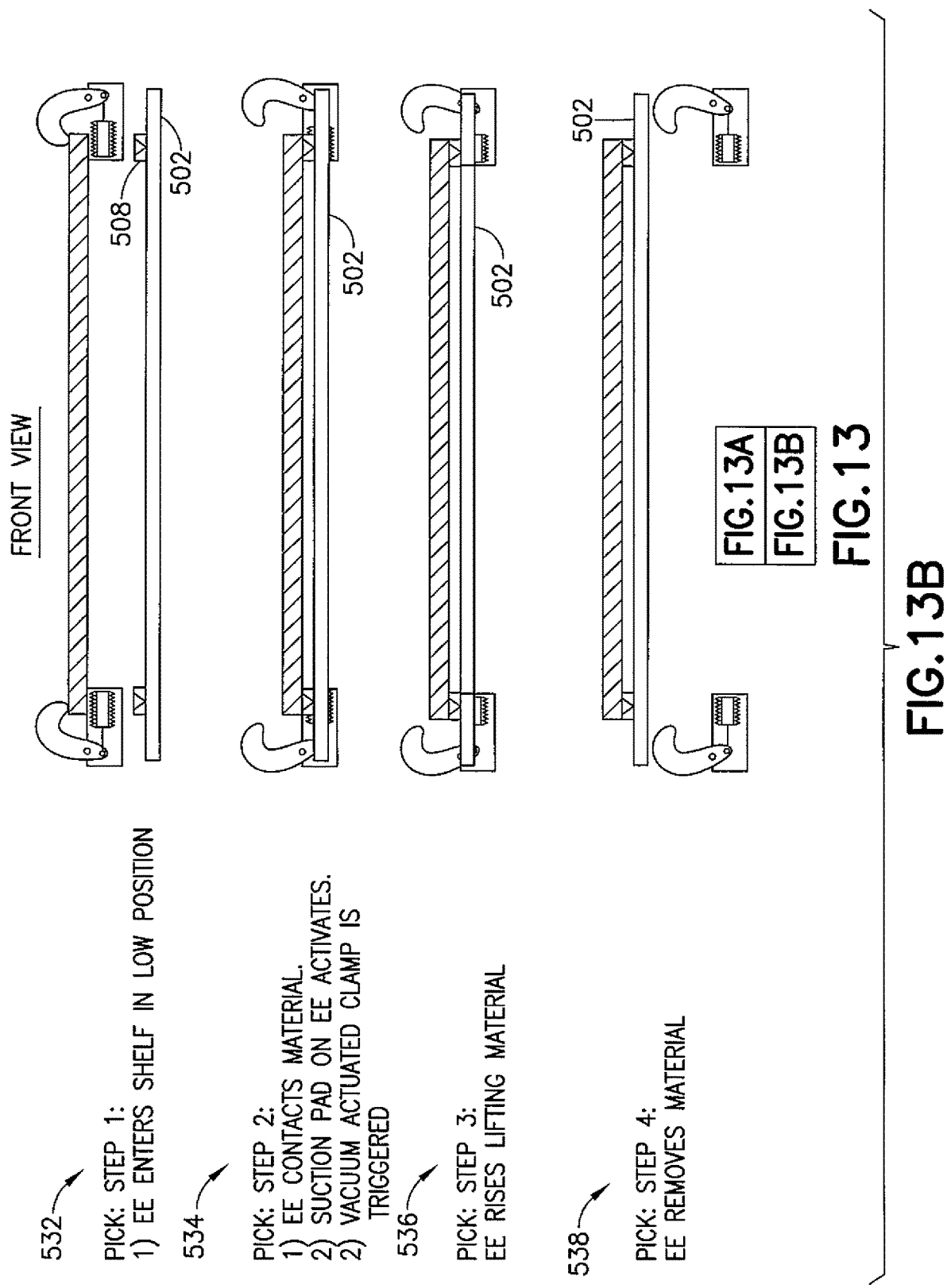

(a)
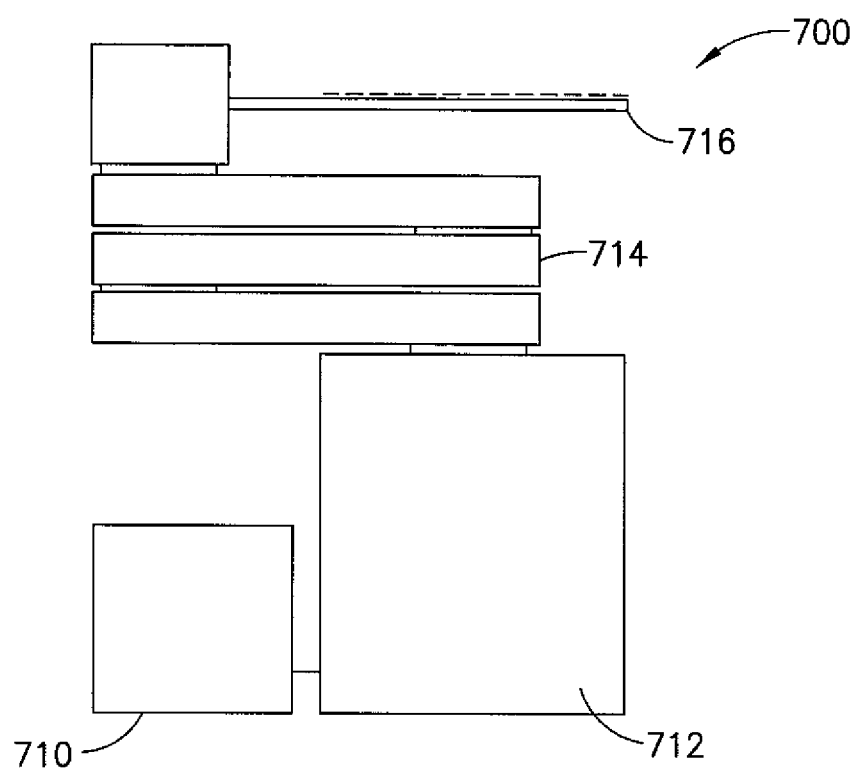
(b)
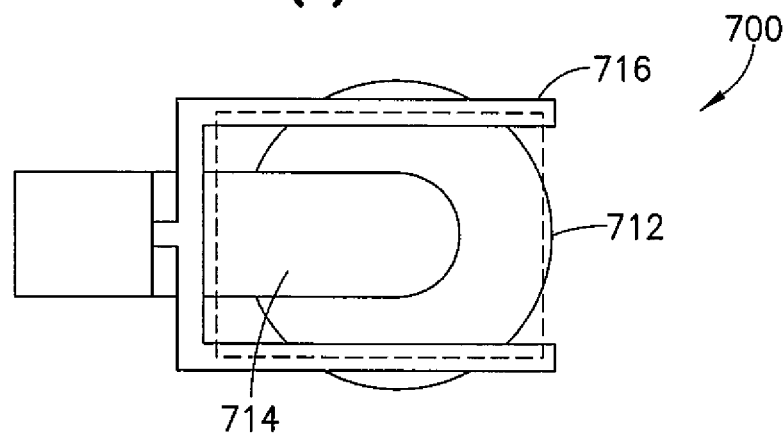
FIG. 16

MATERIAL HANDLING SYSTEM

CROSS REFERENCE TO RELATED APPLICATION(S)

This application claims priority under 35 USC 119(e) on U.S. Provisional Patent Application No. 62/280,788 filed Jan. 20, 2016 which is hereby incorporated by reference in its entirety.

BACKGROUND

Technical Field

The exemplary and non-limiting embodiments relate generally to a material handling system and more particularly to a material handling systems and method.

Brief Description of Prior Developments

Thin sheets of material may be used in solar, semiconductor or other material processing. Material handling of thin sheets poses challenges as the sheets get thinner due to the stiffness, flexibility and flatness of the material. As the material area increases, these challenges grow.

SUMMARY

The following summary is merely intended to be exemplary. The summary is not intended to limit the scope of the claims.

In accordance with an example embodiment, an apparatus comprises a frame; and a plurality of clamps connected to the frame, where at least one of the clamps is movable to releasable clamp a sheet of material on the apparatus, where the plurality of clamps are configured and located on the frame to be limited to clamp on the sheet of material at least two edges of the sheet of material.

In accordance with another example embodiment, a storage container comprises an enclosure comprising a plurality of shelves inside the enclosure configured to individually support sheets of material thereon; and a plurality of clamps located at the plurality of shelves, where at least some of the plurality of clamps are movable relative to the shelves to clamp the sheets of material respectively at the shelves, and where the plurality of clamps are configured and located on the enclosure to be limited to clamp on the sheet of material at least two edges of the sheet of material.

In accordance with another example embodiment, an end effector comprises a frame configured to support a sheet of material thereon, where the frame is configured to be connected to an arm of a robotic manipulator; and a holding system configured to hold the sheet of material on the frame, where the holding system comprises at least one of a clamp to be limited to clamp on the sheet of material at a side edge of the sheet of material and a vacuum-operated suction pad movably located on the frame, where the holding system is configured to apply a tension on the sheet of material.

BRIEF DESCRIPTION OF THE DRAWINGS

The foregoing aspects and other features are explained in the following description, taken in connection with the accompanying drawings, wherein:

FIG. 11 shows a clamping mechanism;

FIGS. 16(*a*)-16(*b*) show front and top views respectively of a manipulator;

DETAILED DESCRIPTION OF EXAMPLE EMBODIMENTS

Figure 1:
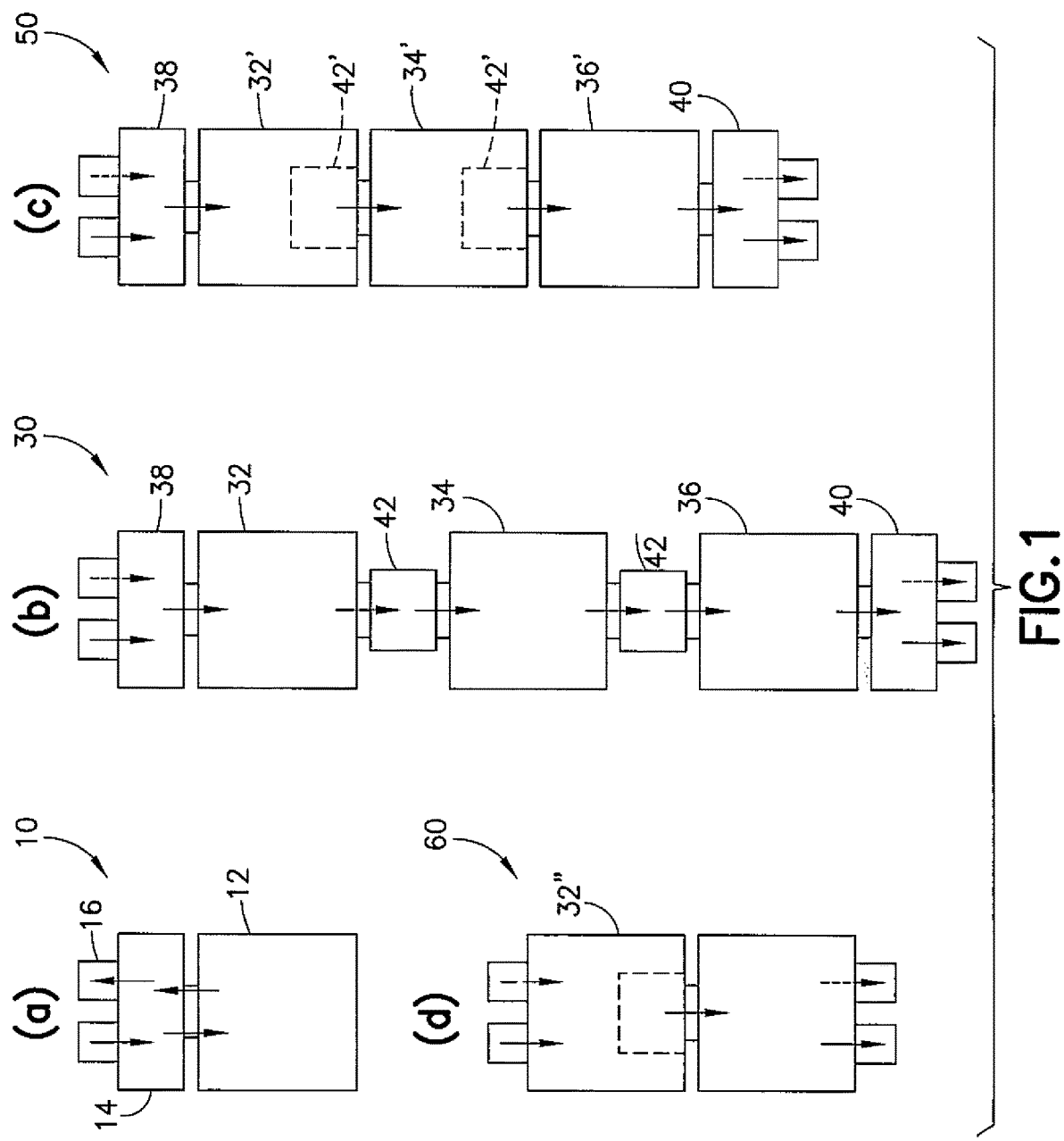
FIGS. 1(*a*)-1(*d*) show top schematic views of a production tool.

Referring to FIG. 1, there is shown a schematic top plan view of an example production tool 10. Although the present embodiment will be described with reference to the embodiments shown in the drawings, it should be understood that the present invention may be embodied in many forms of alternative embodiments. In addition, any suitable size, shape or type of materials or elements could be used.

Production tool 10 may incorporate a system for handling and storage of material as disclosed herein, including material in the form of sheets of varying thickness and flexibility, with minimum contact with the surface of the material. An example layout of production tool 10 utilizing the material and storage system according to the present invention is depicted diagrammatically in FIG. 1(*a*). As illustrated in the figure, the production tool 10 may consist of a processing machine 12 with an interface module 14 (also referred to as an equipment front end module). In this particular example, material is delivered, for instance, in a container 16 to an external interface of the interface module 14, transferred to the processing machine 12, processed in the processing machine 12 and, in a processed form, transferred back to the same interface module and presented for pick-up via an external interface.

As another example, a production line 30 utilizing the material handling and storage system according to the present invention is depicted schematically in FIG. 1(*b*). The production line may include one or more processing machines 32, 34, 36, two interface modules 38, 40 and one or more transfer modules 42. In the example of FIG. 1(*b*), material may be delivered, for instance, in a container, to an external interface of one interface module, transferred to the processing machine, processed in the processing machine, transported via one or more transfer modules to one or more processing machines, transferred to the other interface module and presented for pick-up by an external interface.

The transfer modules 42' may be integrated into the processing machines 32', 34', 36', as shown schematically in the layout 50 of FIG. 1(*c*).

As another example, the interface module may be omitted or integrated into the processing machine 32". An example layout 60 is shown in FIG. 1(*d*).

Figure 2:
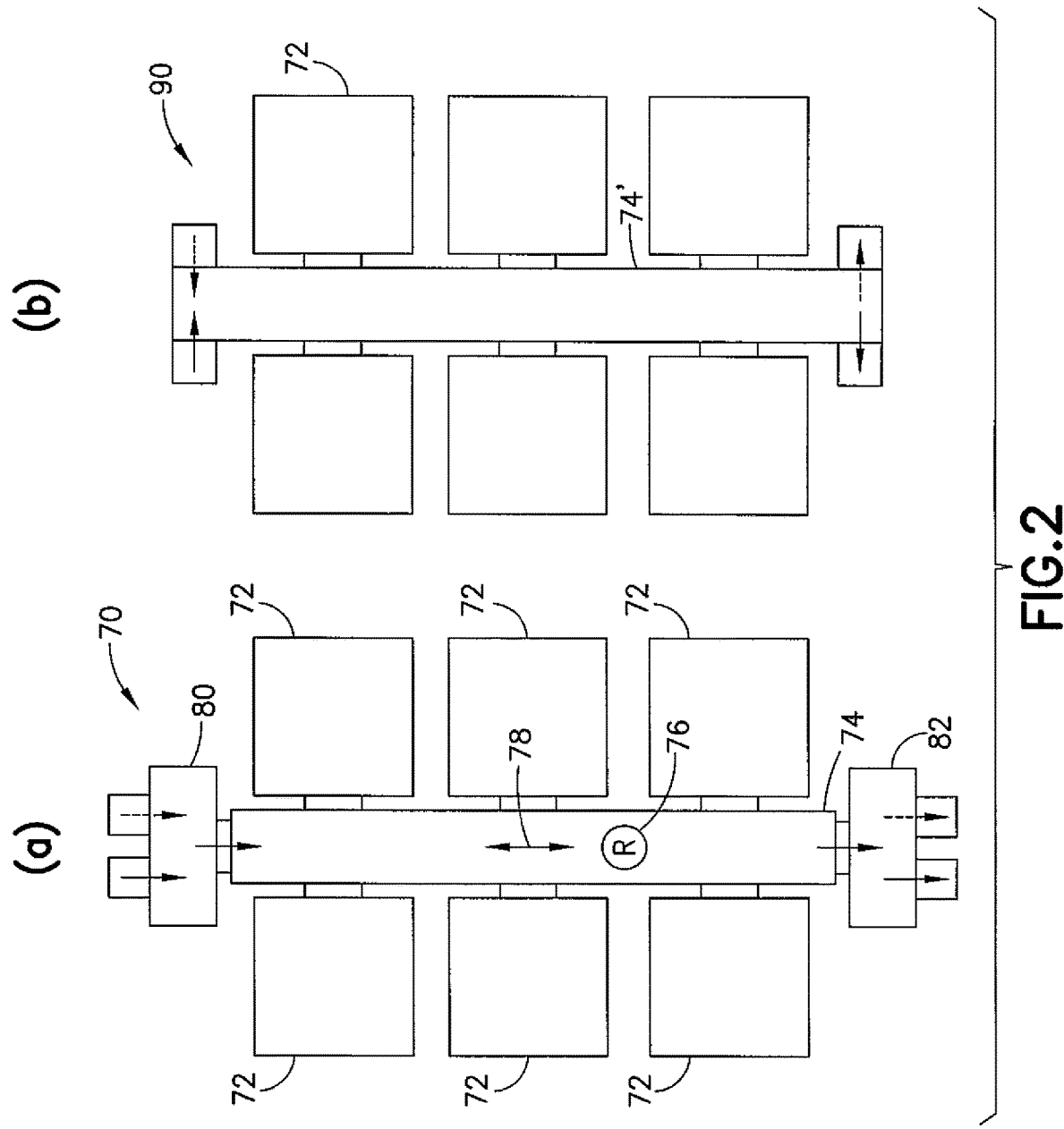
FIGS. 2(*a*)-2(*b*) show top schematic views of a production tool.

In another example, tool 70 is shown in FIG. 2(*a*) where one or more processing machines 72 may be linked to a central transfer module 74 with a robot 76 that may move in a substantially linear manner 78 along the length of the central transfer module 76, carrying material to and from the interface module(s) 80, 82 to the processing machines 72. FIG. 2(*a*) shows an example of such a layout.

As another example, tool 90 is shown in FIG. 2(*b*) where the interface modules may be omitted or integrated into the central transfer module 74'. An example layout is shown in FIG. 2(*b*).

The material handling and storage system according to the present invention may include a material holder, a container for material storage, an interface module, a transfer module and various automation solutions utilized in the interface and transfer modules, including a robotic manipulator and its end-effector.

Interface Module

Figure 3:
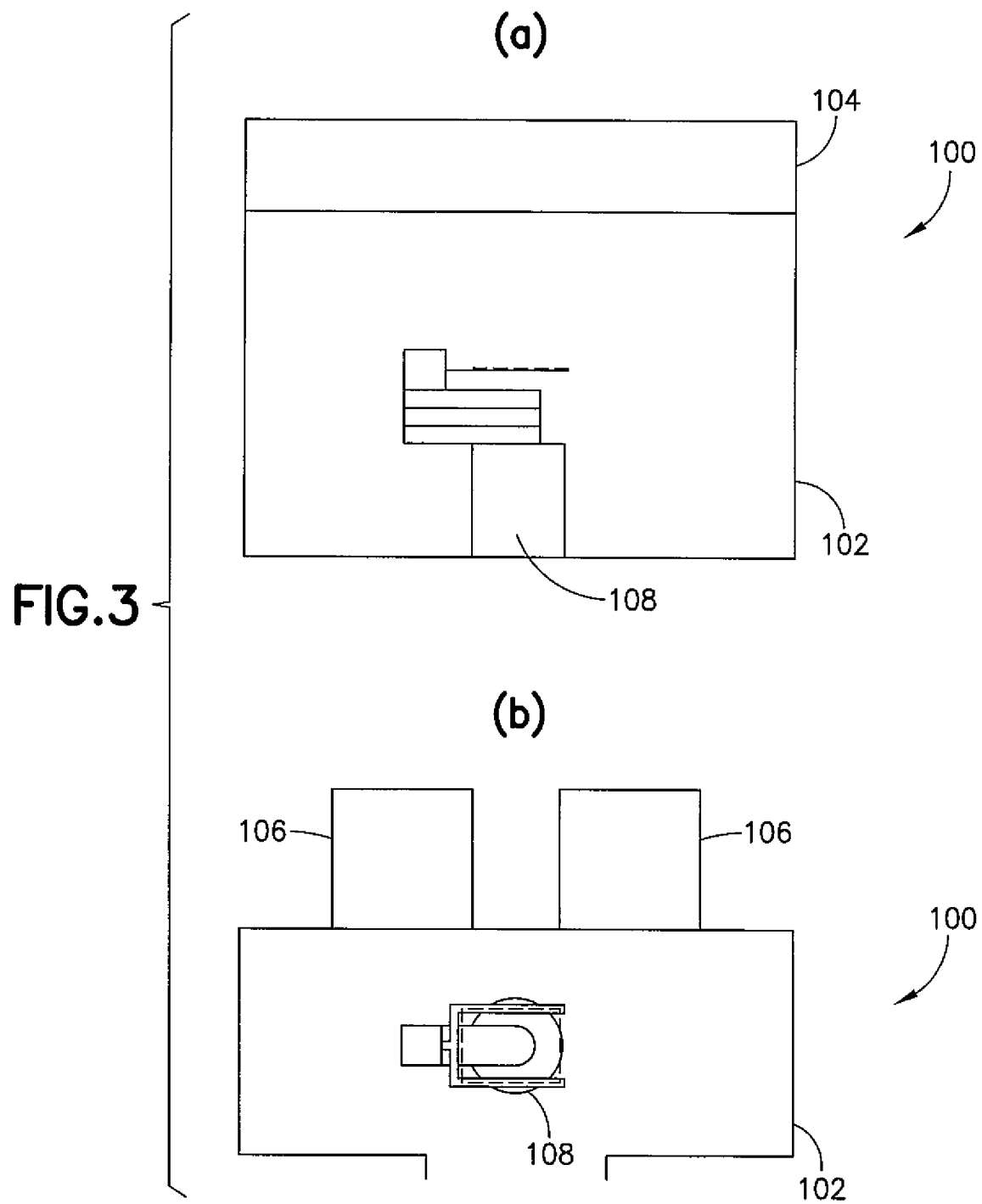
FIGS. 3(*a*)-3(*b*) show side and top views respectively of an interface module.

An example interface module 100 according to the present invention is depicted schematically in FIGS. 3(*a*)-3(*b*) where diagram 3(*a*) shows the side view and diagram 3(*b*) shows the top view. As illustrated in the figure, the interface module 100 may include an enclosure 102, one or more fan-filter units 104, one or more external interfaces 106, for instance, load ports, one or more machine interfaces, for instance, an opening or valve, and a robotic manipulator 108.

The enclosure 102 of the interface module 100 may be configured to separate the interior space of the interface module from external environment, providing a controlled environment, for instance a clean environment, and controlled air flow within the interface module. The robotic manipulator 108 may be configured to transfer material between the external interface(s) 106 of the interface module and the machine interface (opening or valve) of the interface module 100.

The interface module may further include additional devices and accessories, such as a power distribution unit, a buffer station, a measurement or inspection station, a bar code reader, a controller, a computer, a light tower and a machine-human interface.

Transfer Module

Figure 4:
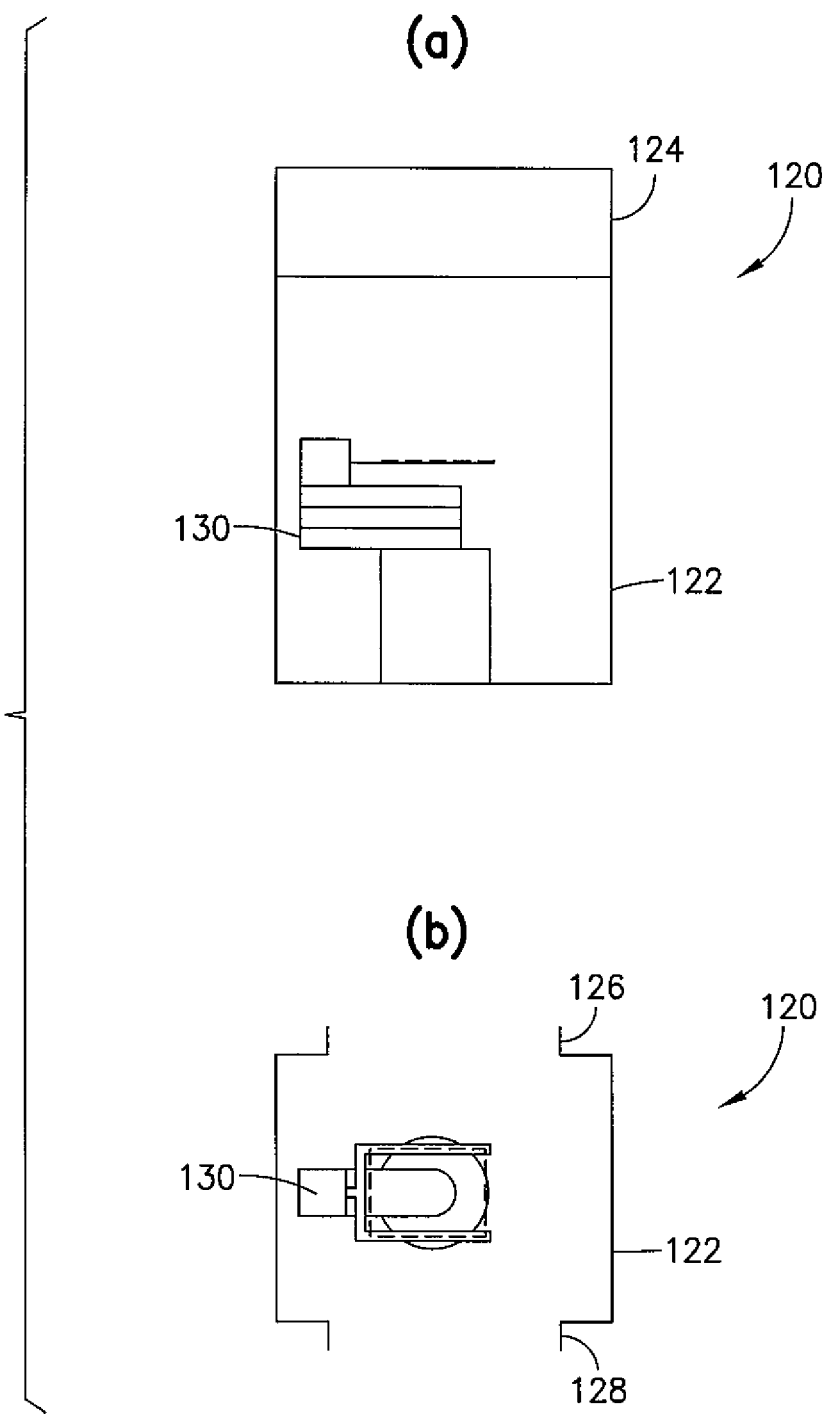
FIGS. 4(*a*)-4(*b*) show side and top views respectively of a transfer module.

As illustrated in FIGS. 4(*a*)-4(*b*), an example transfer module 120 according to the present invention may consist of an enclosure 122, one or more fan-filter units 124, two or more machine interfaces 126, 128, for instance, in the form of an opening or valve, and a robotic manipulator 130.

The enclosure 122 of the transfer module 120 may be configured to separate the interior space of the transfer module from external environment, providing a controlled environment, for instance a clean environment, and controlled air flow within the transfer module. The robotic manipulator 130 may be configured to transfer material between the interfaces 126, 128 of the transfer module.

The interface module 120 may further include additional devices and accessories, such as a power distribution unit, a buffer station, a measurement or inspection station, a bar code reader, a controller, a computer, a light tower and a machine-human interface.

The transfer module 120 may also be integrated with one or more processing machines. In this case, the transfer module may become an integral part of the processing machine(s) and share the same enclosure.

Material Holder

A material holder may be used to support the material, which may have the form of a sheet of various shapes, thicknesses and degrees of flexibility, while it is being transported.

An example material holder according to the present invention is depicted diagrammatically in FIGS. 5-9. The material holder may be configured to receive and hold material in the form of a substantially rectangular sheet, accommodate sheets of various thicknesses and degrees of flexibility, and contact the sheet in limited narrow areas along the edges of the sheet without touching interior surfaces on either side of the sheet.

Figure 5:
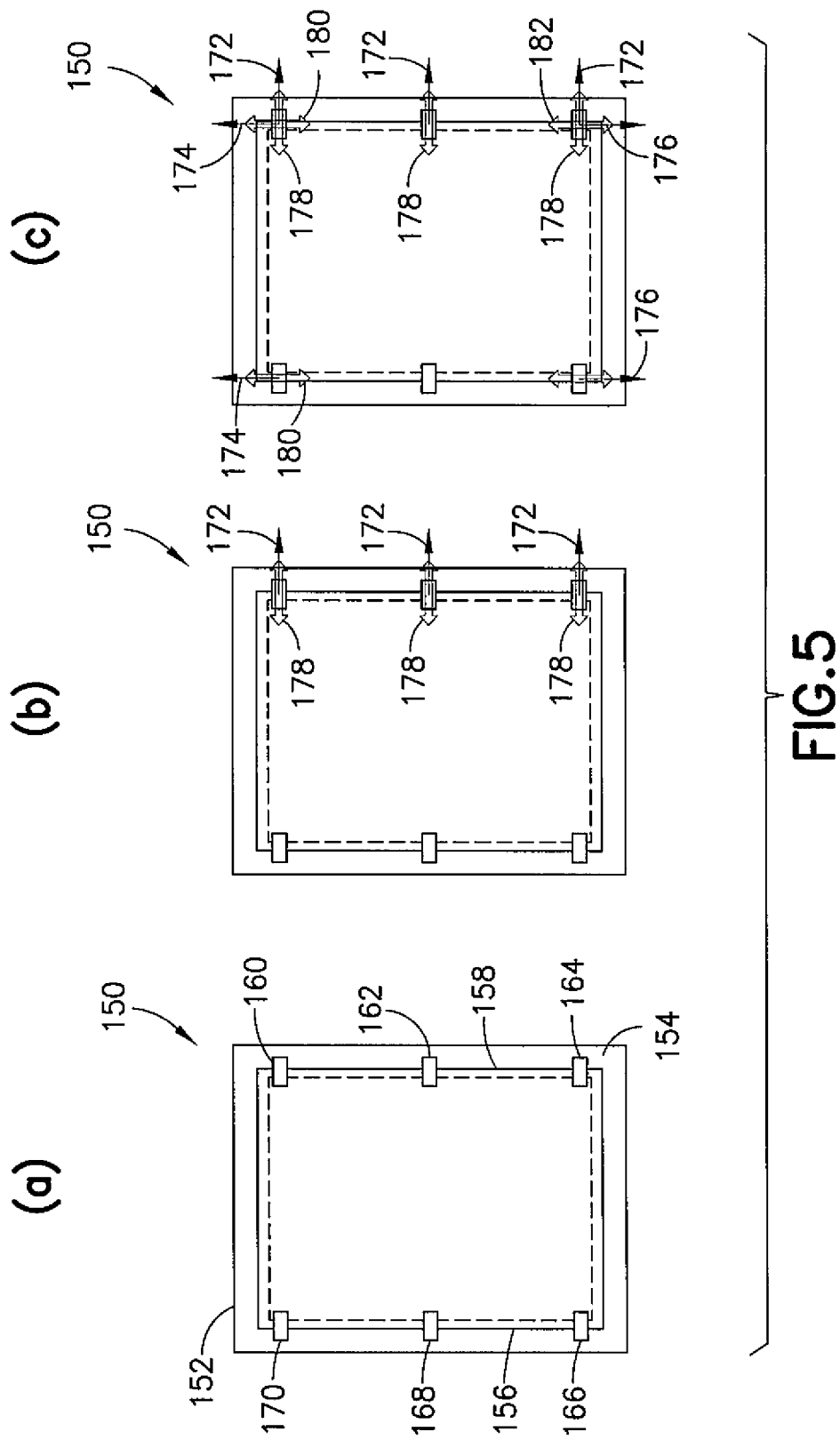
FIGS. 5(*a*)-5(*c*) show top views of a material holder.

As illustrated in FIG. 5(*a*), the material holder 150 may include a frame 152, which may feature a clamping mechanism 154 that may secure the sheet along its edges 156, 158 to prevent the sheet from slipping from the shelf. The clamping mechanism 154 may clamp the sheet continuously along selected edges 156, 158 of the sheet or, alternatively, it may clamp the sheet in discrete locations 160, 162, 164, 166, 168, 170 in order to provide space along the edges of the sheet so that the sheet can be supported when it is released (unclamped) from the material holder.

The clamps of the clamping mechanism may be conveniently implemented in the form of a flexure, thus reducing the risk of particle contamination, which is typically associated with sliding parts, and cost.

Figure 6:
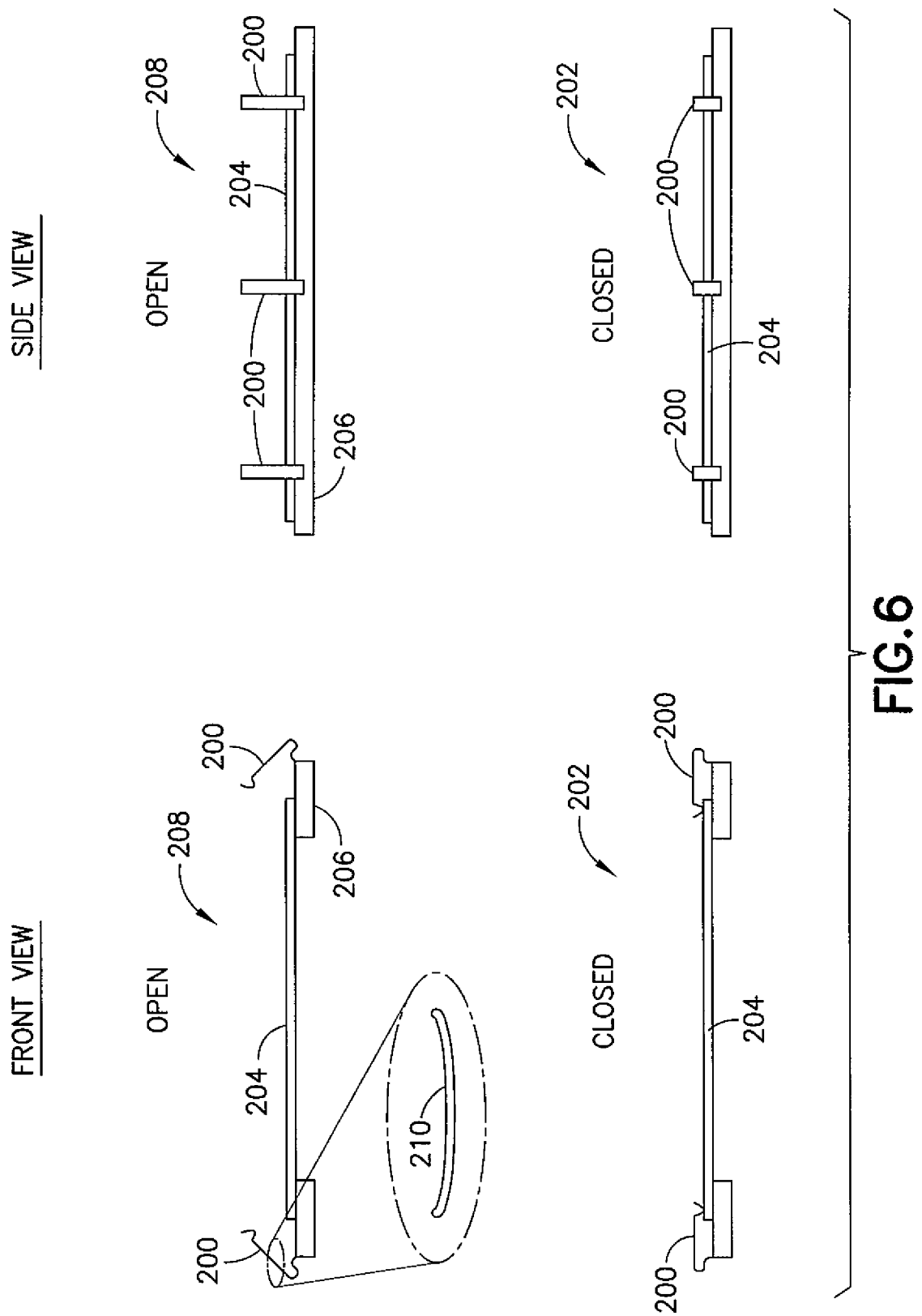
FIG. 6 shows an example flexure.

An example flexure 200 is depicted diagrammatically in FIG. 6. In this particular example, the flexure may naturally assume the closed 202 (clamped) state. In order to open the flexure, and unclamp the sheet 204, an actuation force may need to be applied. The force may need to remain present in order to maintain the flexure in the open state 208. Alternatively, the flexure may be configured 210 to exhibit a bi-stable behavior, for example the flexure may passively maintain either a closed (clamped) state 202 or an open (unclamped) state 208. A bi-directional actuation force may be required in order to transition from one state to the other.

The clamps may open wide enough such that the material can enter or depart the holder in a vertical direction. Alternatively, the material can enter the holder in a horizontal direction.

Figure 7:
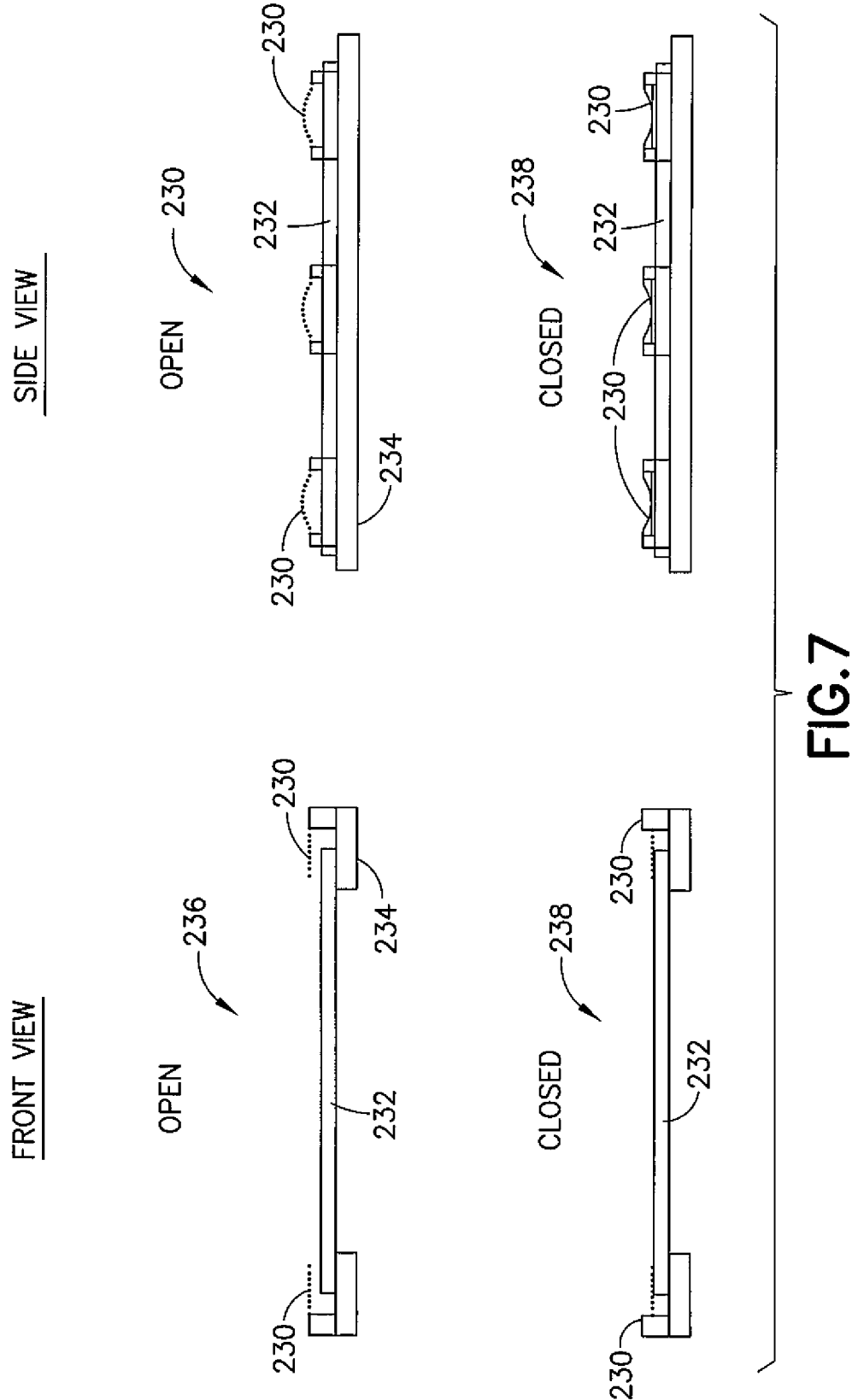
FIG. 7 shows an example flexure.

Another example flexure 230 clamping material 232 is depicted diagrammatically in FIG. 7. A closed (clamped) state 238 of the flexure is illustrated by solid line and an open (unclamped) state 236 of the flexure is illustrated by dashed line. In this example, the flexure may be configured to exhibit a bi-stable behavior, for example the flexure may passively maintain either a closed (clamped) state or an open (unclamped) state. A bi-directional actuation force may be required in order to transition from one state to the other.

In the example of FIG. 7, the material 232 may enter the material holder in a substantially horizontal direction. However, the material holder may be configured to enable the material to enter the holder in the vertical direction.

The clamping mechanism may also feature a tensioning arrangement that may exert a predefined force (tension) to the sheet to minimize sagging. As an example, see FIG. 5(*b*), the frame 152 of the material holder 150 may feature one or more fixed clamps 166, 168, 170 on one side of the frame and one or more movable clamps 160, 162, 162 on the opposite side of the frame. The movable clamps may be arranged to apply tensioning force 172 in the direction substantially perpendicular to the edge of the sheet. In FIG. 5(*b*), the directions of motion of the movable clamps are indicated by transparent arrows 178, and the directions of the tensioning forces 178 are indicated by the solid arrows.

As another example, depicted in FIG. 5(c), the frame 152 of the material holder 150 may feature one or more fixed clamps 168 on one side of the frame and one or more movable clamps 166, 170 on the same side of the frame. The movable clamps on the same side of the frame may be arranged to apply tensioning force 174, 176 in the direction substantially parallel with the edge of the sheet. In addition, the frame may feature one or more movable clamps 160, 162, 164 on the opposite side of the frame. Each of the movable clamps on the opposite side of the frame may be arranged to apply tensioning force in two directions, for instance, in a direction 174, 176 substantially parallel with the edge of the sheet and a direction 172 substantially perpendicular to the sheet. In FIG. 5(c), the directions of motion of the movable clamps are indicated by transparent arrows 178, 180, and the directions of the tensioning forces 174, 176, 172 are indicated by the solid arrows.

Alternatively, any suitable arrangement of fixed and movable clamps along any of the edges of the sheet may be utilized to clamp and tension the sheet.

In order to insert a sheet into the material holder, the clamps may be in an open state and, if a tensioning arrangement is used, in their nominal locations. The clamps may then be engaged (closed) and tensioning forces may be applied to hold the sheet in place. In order to extract the sheet from the material holder, the tensioning forces may be removed and the clamps may be disengaged (opened).

The clamps may be operated, for example opened to unclamp the sheet, manually, mechanically, electrically, magnetically, pneumatically, by vacuum or by any other suitable means of actuation, including their combination. The actuation may be provided externally or by actuators built into the material holder. The clamps may be held closed, for example engaged to keep the sheet clamped, using springs (mechanical, pneumatic or of any other suitable type) or other spring-like arrangements, including flexures.

The clamps may also be made in part or in whole of smart materials which may change shape and size on application of electric voltage, thermal input, electric fields, or magnetic fields. Smart materials that may be used for this purpose include, but are not limited to, piezoelectric materials, shape memory polymers, magneto-strictive materials, and dielectric-elastomers.

Similarly, the tensioning arrangement may be operated, for example the clamps may be repositioned to their nominal locations, manually, mechanically, electrically, magnetically, pneumatically, by vacuum or by any other suitable means of actuation, including their combination. The actuation may be provided externally or by actuators built into the material holder. Tensioning force may be provided using springs (mechanical, pneumatic or of any other suitable type) or other spring-like arrangements, including flexures.

Figure 8:
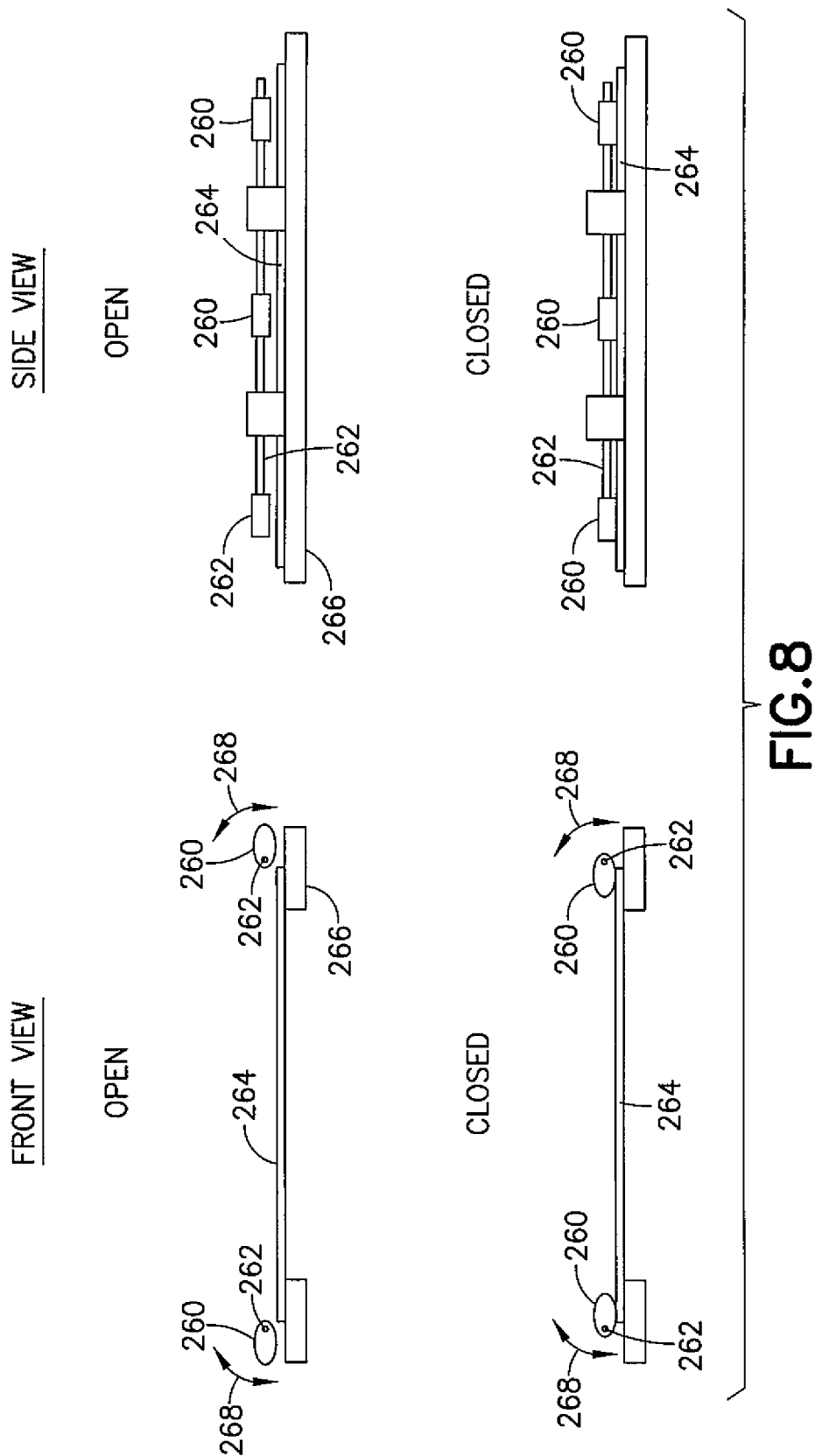
FIG. 8 shows an example clamp arrangement.
Figure 9:
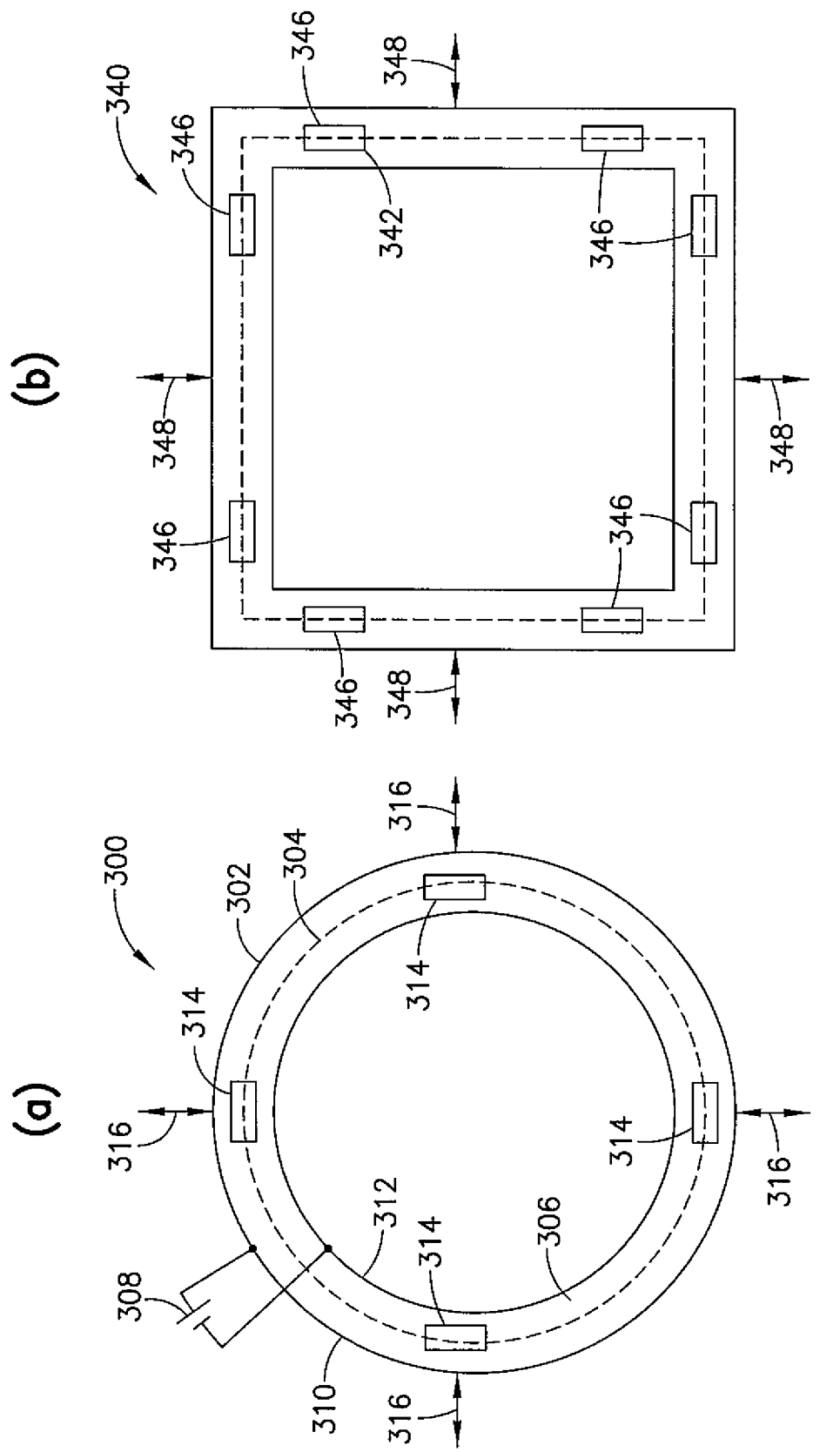
FIGS. 9(*a*)-9(*b*) show top views of a material holder.

Another example of a clamping arrangement is depicted diagrammatically in FIG. 8. In this example, there is one or more cam-like structure 260 on a rotating shaft 262. In the open position, the cams 260 are in the outside position, allowing for the material 264 to enter or leave the material holder 266 in the vertical direction. In the closed position, the cams push down on the material, thus clamping its edge. The cams may need to have an actuation force or torque 268 applied to retain the clamping force on the clamp material 264.

The material of the cams and their shape may be selected such that, as the cams begin to clamp the material edge, they also generate a tensioning force. Alternatively, the shaft with the cams may move outwards away from the material as the cam begins to clamp the material edge, thus providing a combined clamping and tensioning action.

Another example of a material holder 300 is shown in FIG. 9(a). In this example, a circular material holder frame 302 for substantially circular materials 304 may be made, in whole or in part, of a smart material 306 so that the frame shrinks 316 in diameter on application of magnetic, thermal or electrical input 308. As an example, the frame may be made of an electro active polymer so that application of a voltage across the inside 310, 312 and outside surfaces of the frame creates a radial electric field inside the material, causing the diameter of the frame to become smaller. The frame stays at the smaller diameter as long as the voltage is held. The material may be inserted into the frame while it is in this state and held in place using the clamps 314 shown in the figure. When the voltage is removed, the frame may expand 316 to its natural state, tensioning the material in the process. This method creates a substantially uniform tension on the material, allowing it to be clamped with less risk of wrinkling.

While the example of an electroactive polymer has been used here, the material holder frames may also be made with the use of other smart materials including, but not limited to, piezoelectric materials, shape memory polymers, magneto-strictive materials and dielectric-elastomers.

While the example of circular frame has been used in FIG. 9(a), it is also possible to make material holder frames with the use of smart materials in other shapes. An example of a rectangular material holder frame 340 is shown in FIG. 9(b). In this example, a rectangular material holder frame 344 for substantially rectangular materials 342 may be made, in whole or in part, of a smart material so that the frame shrinks 348 on application of magnetic, thermal or electrical input. As an example, the frame may be made of an electroactive polymer so that application of a voltage across the inside and outside surfaces of the frame creates a electric field inside the material, causing the frame to become smaller. The frame stays at the smaller size as long as the voltage is held. The material may be inserted into the frame while it is in this state and held in place using the clamps 346 shown in the figure. When the voltage is removed, the frame may expand 348 to its natural state, tensioning the material in the process. This method creates a substantially uniform tension on the material, allowing it to be clamped with less risk of wrinkling.

While it may be convenient to use a material holder to support a sheet of material while it is being transported, in particular when the sheet is thin and flexible, the material handling system according to the present invention may handle material without a material holder.

Storage Container

An example container (or carrier) 400 according to the present invention is depicted in FIGS. 10(a)-10(c) (the figure shows schematically the side view of the open container and the top view of a cross-section of the container). The container may include an enclosure 402, one or more shelves 404, an opening 406 and a door 408. Each shelf may be configured to receive a material holder 410, for instance, the example material holder described earlier in the document.

Alternatively, each shelf of the container may be configured to receive and hold material in the form of a sheet, accommodate sheets of various thicknesses and degrees of flexibility, and contact the sheet in limited narrow areas along the edges of the sheet without touching interior surfaces on either side of the sheet. To this end, each of the shelves may feature a clamping mechanism 412 that may secure the sheet along its edges to prevent the sheet from slipping from the shelf.

The clamping mechanism may clamp the sheet continuously along selected edges of the sheet or, alternatively, it may clamp the sheet in discrete locations in order to provide space along the edges of the sheet so that the sheet can be picked and placed, for instance, by an end-effector of a robotic manipulator.

Figure 10:
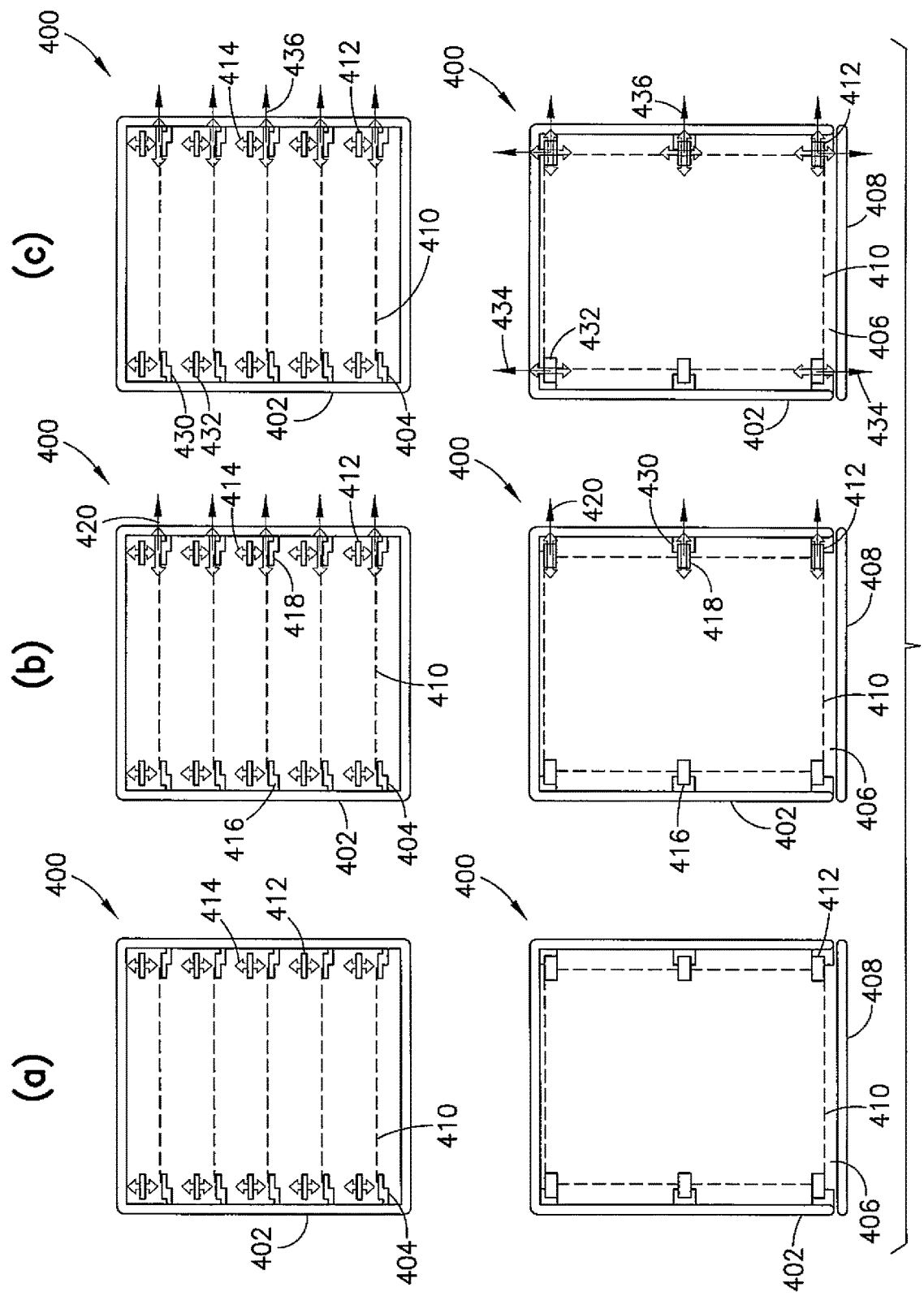
FIGS. 10(*a*)-10(*c*) each show front and top views of a carrier.

As shown diagrammatically in FIGS. 10(*a*)-10(*c*), the clamps may move in a direction substantially normal 414 to the surface of the sheet. Alternatively, the clamps may pivot to the side or perform any suitable motion to engage (clamp the sheet) and disengage (unclamp the sheet).

As illustrated in FIGS. 10(*a*)-10(*c*), the clamping mechanism may clamp the sheet from above, which is convenient when the end-effector supports the sheet from underneath. This is because the vertical location where the end-effector comes to contact with the sheet during a pick operation and loses contact with the sheet during a place operation remains consistent regardless of the thickness of the sheet, allowing for simple setup of the robotic manipulator. Alternatively, the clamping mechanism may clamp the sheet from underneath, which may be preferred when the end-effector grips the sheet from above. Again, this is convenient because the vertical location where the end-effector comes to contact with the sheet during a pick operation (and loses contact with the sheet during a place operation) remains consistent regardless of the thickness of the sheet.

The clamps of the clamping mechanism may be conveniently implemented in the form of a flexure, thus reducing the risk of particle contamination, which is typically associated with sliding parts, and cost. Example flexures are described earlier in the text with respect to FIGS. 6 and 7 by way of example.

The clamping mechanism may also feature a tensioning arrangement that may exert a predefined force (tension) to the sheet to minimize sagging. As an example, see FIG. 10(*b*), a shelf of the carrier may feature one or more fixed clamps 416 on one side of the shelf and one or more movable clamps 418 on the opposite side of the shelf. The movable clamps may be arranged to apply tensioning force in the direction 420 substantially perpendicular to the edge of the sheet. In the figure, the directions of motion of the movable clamps are indicated by transparent arrows, and the directions of the tensioning forces are indicated by the solid arrows.

As another example, depicted in FIG. 10(*c*), a shelf of the carrier may feature one or more fixed clamps on one side of the shelf 430 and one or more movable clamps 432 on the same side of the shelf. The movable clamps on the same side of the shelf may be arranged to apply tensioning force 434 in the direction substantially parallel with the edge of the sheet. In addition, the shelf may feature one or more movable clamps on the opposite side of the shelf. Each of the movable clamps on the opposite side of the shelf may be arranged to apply tensioning force in two directions, for instance, in a direction substantially parallel with the edge of the sheet and a direction 436 substantially perpendicular to the sheet. In FIG. 10(*c*), the directions of motion of the movable clamps are indicated by transparent arrows, and the directions of the tensioning forces are indicated by the solid arrows.

Alternatively, any suitable arrangement of fixed and movable clamps along any of the edges of the sheet may be utilized to clamp and tension the sheet.

In order to place a sheet on a shelf, the clamps associated with the shelf may be in an open state and, if tensioning arrangement is used, in their nominal locations. The clamps may then be engaged (closed) and tensioning forces may be applied to hold the sheet in place. In order to extract the sheet from the shelf, the tensioning forces may be removed and the clamps may be disengaged (opened).

The clamps may be operated, for example opened to unclamp the sheet, manually, mechanically, electrically, magnetically, pneumatically, by vacuum or by any other suitable means of actuation, including their combination. The actuation may be provided externally or by actuators built into the carrier. The clamps may be held closed, for example to keep the sheet clamped, using springs (mechanical, pneumatic or of any other suitable type) or other spring-like arrangements, including flexures.

Similarly, the tensioning arrangement may be operated, for example the clamps may be repositioned to their nominal locations, manually, mechanically, electrically, magnetically, pneumatically, by vacuum or by any other suitable means of actuation, including their combination. The actuation may be provided externally or by actuators built into the carrier. Tensioning force may be provided using springs (mechanical, pneumatic or of any other suitable type) or using other spring-like arrangements, including flexures.

In one example embodiment, the clamping mechanism and/or the tensioning arrangement may be electrically actuated by actuators built into the carrier. In particular, the carrier may have external electrical and/or signal pickups, such that when the carrier is in place, the electrical and/or signals pickups are connected and powered. The carrier is signaled when the end effector of the robotic manipulator picks or places material from and to the container, allowing the clamping and tensioning mechanisms to be engaged or disengaged accordingly. In another example embodiment the electrical pickups may be within the carrier and be powered by the robot end effector, or some combination of the two.

In another example embodiment, the clamping mechanism and/or the tensioning arrangement may be actuated by vacuum actuators built into the carrier. In particular, the carrier may have external features allowing for a temporary vacuum connection to supply vacuum and/or signal pickups, such that when the carrier is in place the vacuum and/or signals pickups are connected and powered. The carrier is signaled when the end effector of the robotic manipulator picks or places material from and to the container, allowing the carrier to engage or disengage clamping and tensioning mechanisms using vacuum actuation.

In another example embodiment, the clamping mechanism and/or the tensioning arrangement may be actuated by compressed clean dry air (CDA), nitrogen or other appropriate gas or mixture of gases using actuators built into the carrier. In particular, the carrier may have external features allowing for a temporary CDA connection and/or signal pickups, such that when the carrier is in place the CDA and/or signals pickups are connected and powered. The carrier is signaled when the end effector of the robotic manipulator picks or places material from and to the container, allowing the carrier to engage or disengage clamping and tensioning mechanisms using CDA actuation.

In another example embodiment, the clamping mechanism and/or the tensioning arrangement may be actuated mechanically by an end-effector of a robotic manipulator when the robotic manipulator picks and places material from and to the container. In particular, the robotic manipulator may provide actuation by engaging the end-effector with one or more mechanical features in the container and moving the end-effector to transfer motion through the one or more features to the clamping mechanism and the tensioning arrangement. An example 450 is shown in FIG. 11.

Figure 12B:
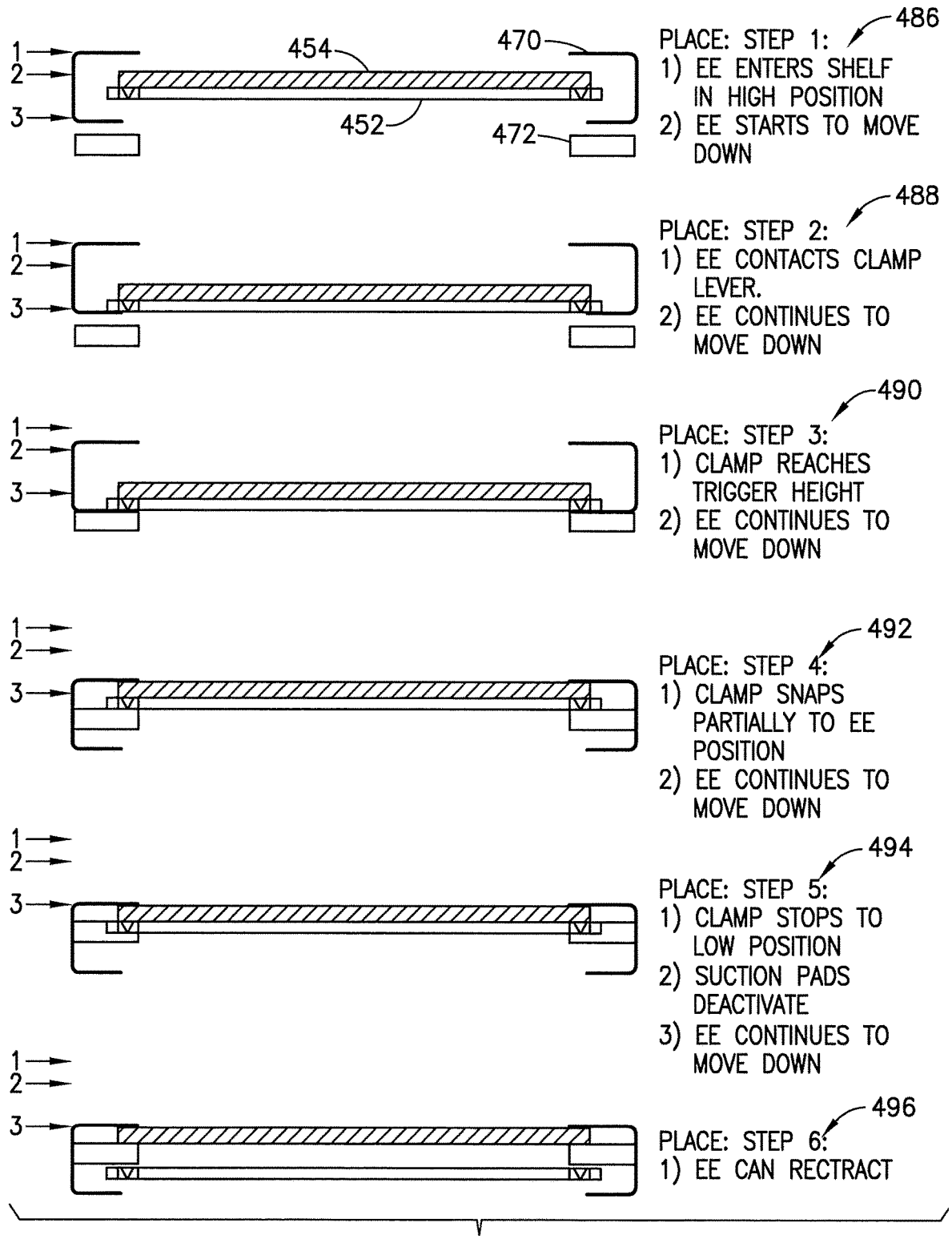
FIG. 12 shows a clamping mechanism.

In the example of FIG. 11, the end effector 452 performs a transfer of material 454 from the container to the end effector (a pick operation). The robot may extend 456 the end-effector into the container 470 below the material to be picked. Once inside the container, the end effector may start to rise. As the end-effector moves upward and approaches the material 458, the vacuum grips 460 on the end effector may grab the edges of the material. At around the same time, the bi-stable clamp 462 may be pushed up, opening 464 the bi-stable clamps on the container 470 and releasing the material from the container. The end-effector then may rise further to clear the material from the shelf 472 and may be slid 468 out of the container 470. The reverse transfer scenario, for example the transfer of material from the end-effector to the container (place operation) may be achieved by following the process in reverse order, as depicted in FIG. 12. The figure illustrates how the opening and closing of the bi-stable clamp may be properly synchronized with the motion of the end-effector both for pick and place operations. Heights of the clamp include opening height 1 480, trigger height 2 482 and close height 3 484. The place operation includes a step 1 486 where the end effector enters the shelf in the high position and starts to move down, step 2 488 where the end effector contacts the clamp lever and continues to move down, step 3 490 where the clamp reaches the trigger height and the end effector continues to move down, step 4 492 where the clamp snaps partially to the end effector position and the end effector continues to move down, step 5 494 where the clamp stops at the low position and the suction pads deactivate and the end effector continues to move down, and step 6 496 where the end effector can retract completing the place operation.

In another example embodiment, the clamping mechanism and/or the tensioning arrangement may be operated by vacuum provided by an end-effector of a robotic manipulator when the robotic manipulator picks and places material from and to the container. The container and the end-effector may feature an interface that may allow the end-effector to establish a temporary vacuum connection and supply vacuum to operate the clamping mechanism and/or the tensioning arrangement. An example is shown in FIG. 13.

Figure 13A:
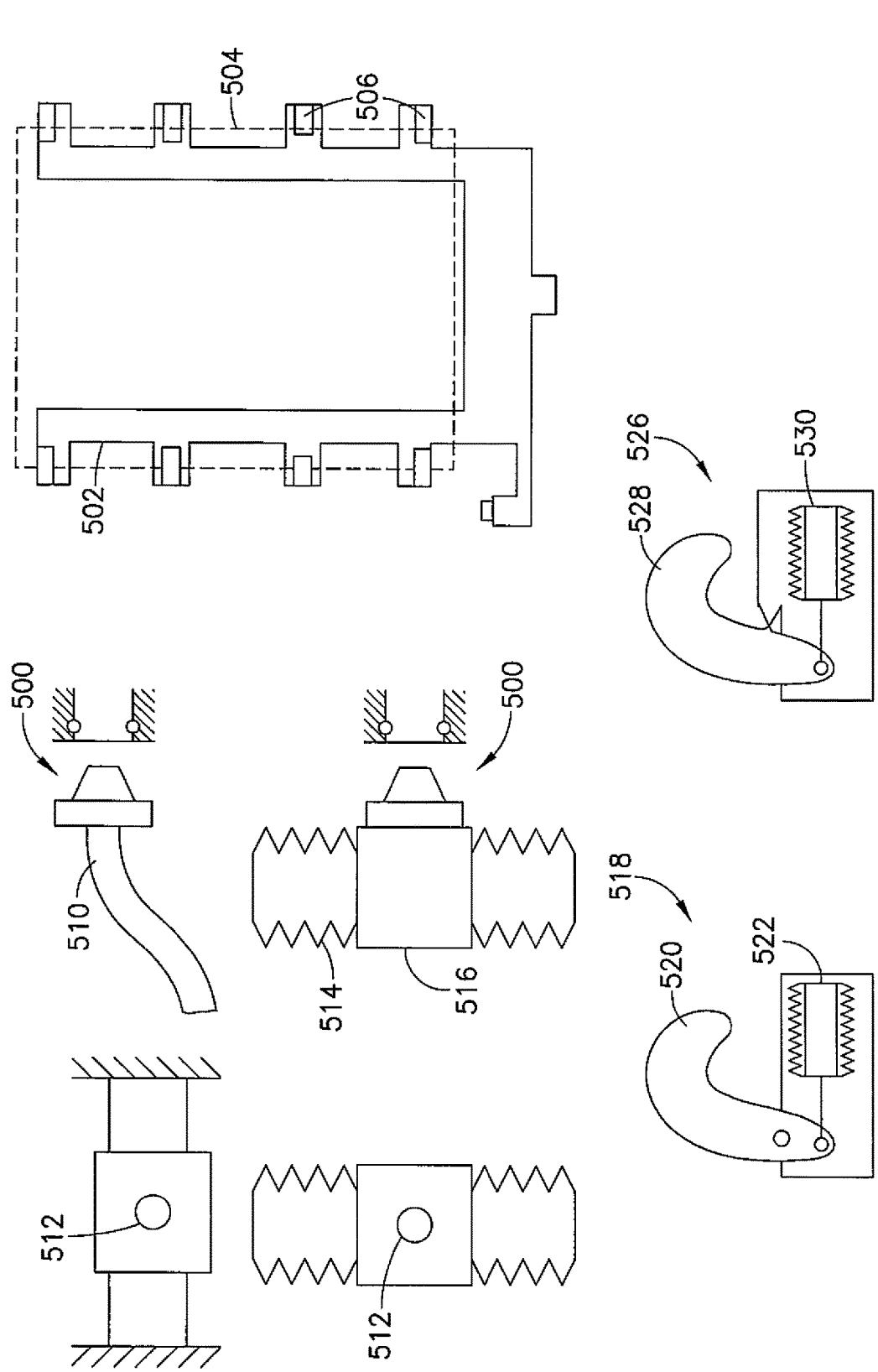
FIG. 13 shows a shelf.

In this example of FIG. 13, each shelf in the container may have a conical vacuum connector 500 that may actuate the clamps 506 associated with the shelf. The clamps on the container may be spring loaded to stay closed until a vacuum force is applied to force them open. In one example, pivoting vacuum clamp 518 may be provided with clamp 520 actuated by spring bellows 522 that contracts on the application of vacuum. The vacuum clamp may alternately be a flexure based vacuum clamp where clamp 528 is activated by a bellows where the use of flexures 530 may provide holding or bi stable action as shown in the inset. The conical vacuum connector 500 may be mounted on a mechanical arrangement that may allow it to move in tandem with the end-effector 502. In the example shown in FIG. 13, this may be achieved by means of bellows 514 or using a combination of a flexible hose 510 and a flexure. The end-effector 502 may have sideward projection at its root with a vacuum receptacle. The vacuum receptacle may have one or more o-rings for maintaining a temporary vacuum seal.

During material transfer from the container to the end-effector, the end-effector may go in low 532, and the vacuum receptacle 516 may have orifice 512 and mate with the conical vacuum connection 500 in the container. The end-effector then may rise 534 until it is in position to capture the material. At this point, the clamps on the end-effector may close, capturing the material. Once the material is captured by the clamps on the end-effector, the vacuum may be activated and the clamps on the container may release the material. The end-effector may then rise further 536, clearing the material from the container clamps, and may proceed to retract 538, disengaging the vacuum connection 500. The conical vacuum connector in the container may be left in the high position to facilitate a reverse transfer in the future. A transfer from the end-effector to the container may be achieved by going through the process in reverse.

Figure 14:
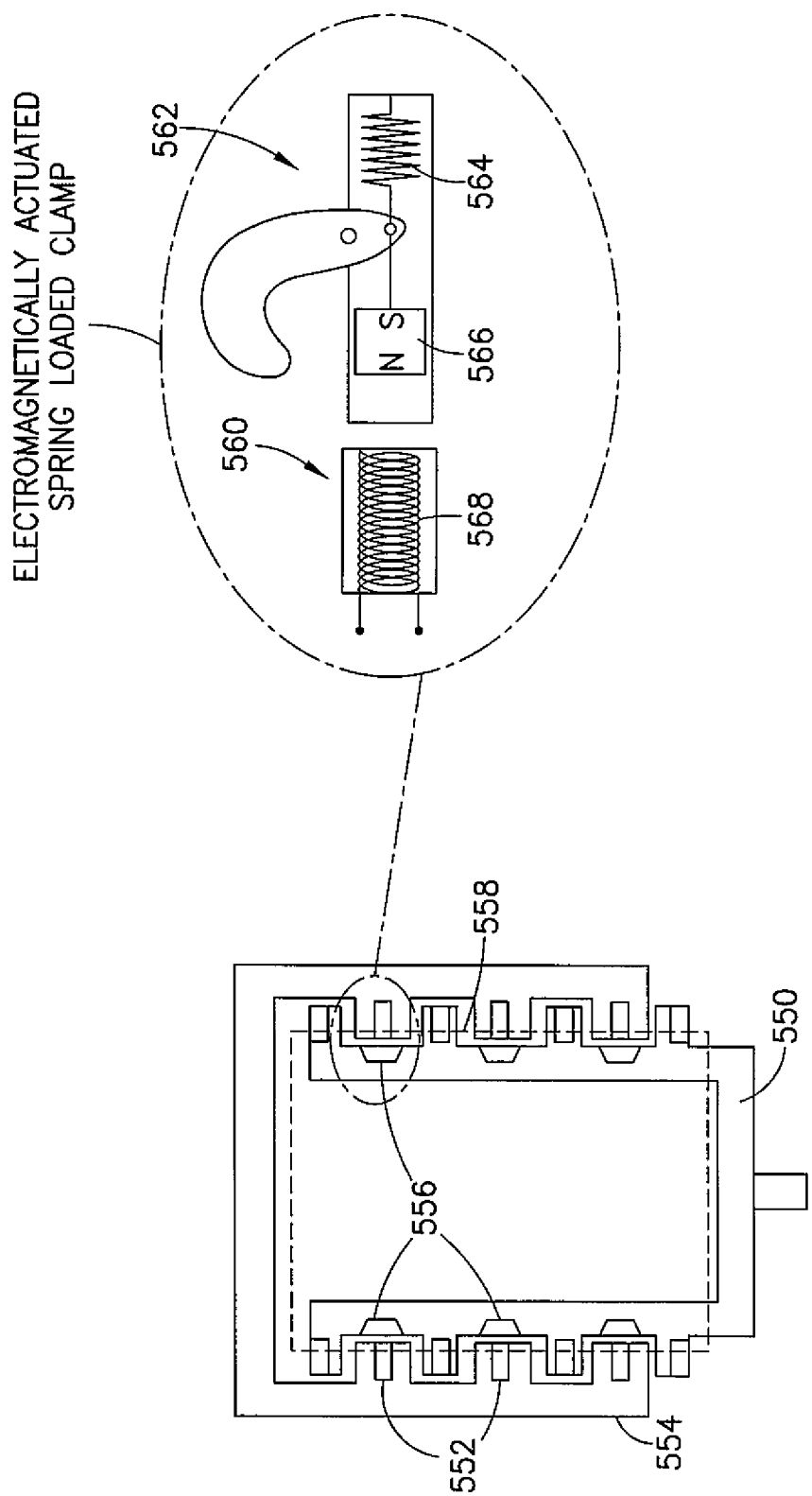
FIG. 14 shows a clamping mechanism.

In another example embodiment, the clamping mechanism and/or the tensioning arrangement may be actuated electromagnetically 560 with electromagnetic actuator 556, as illustrated diagrammatically in FIG. 14. In this example embodiment, the end-effector 550 may include electromagnets 568 incorporated into the end-effector 550 of the robot. As an example, the electromagnets 568 may be placed under the end-effector facing the clamps 552, 562 on the container shelf 554, as shown in FIG. 14. The clamps on the container shelf may be configured to be actuated by the electromagnets on the end-effector so that turning on the electromagnet releases the spring loaded clamp where permanent magnet 568 is engaged by the electromagnet 568 opening clamp 562 and when disengaged spring 564 causes the clamp to stay closed. Here, the clamp may remain closed unless actuated.

During material transfer from the container to the end-effector, the end-effector may go in low and then rise until it is in position to capture the material. At this point, the clamps on the end-effector may close, capturing the material. Once the material is captured by the clamps on the end-effector, the electromagnets may be activated and the clamps on the container may release the material. The end effector may then rise further, clearing the material from the container clamps, and may proceed to retract. A transfer from the end-effector to the container may be achieved by going through the process in reverse.

Figure 15:
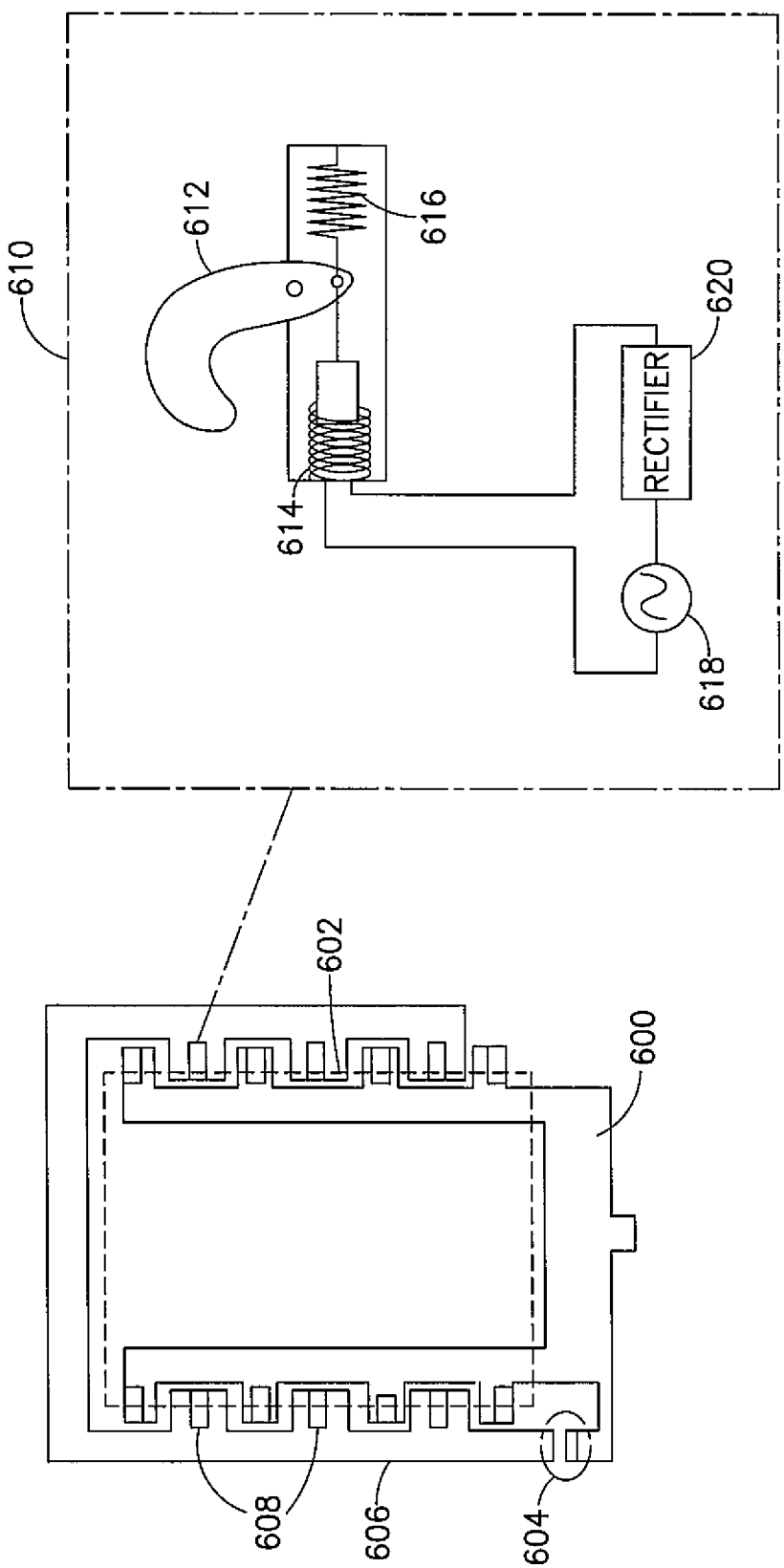
FIG. 15 shows a clamping mechanism.

In yet another example embodiment, the clamping mechanism and/or the tensioning arrangement may be operated via a power coupling, as illustrated diagrammatically in FIG. 15. The function of the power coupling, which may operate, for instance, on an inductive principle, is to transfer electrical power over small gaps.

In the example of FIG. 15, the end-effector 600 may include one or more power coupling modules 604 incorporated into the end-effector of the robot. In this example, the end-effector may feature a sideward projection at its root with a power coupling module. The power coupling module 604 may couple with a receiving module on the shelf 606 of the container, as shown in FIG. 15. The receiving module may have a vertically elongated form to allow for power transfer while the end-effector is moving in the vertical direction. The spring-loaded clamps 608, 610 on the container shelf may be electrically actuated by the power from the power coupling using, for instance, a solenoid 614 driven by a rectified 620 voltage from the ac power coupling 618 when coupled to the power coupling 604. In this example, the spring-loaded clamp 612 may stay open only as long as the power coupling is activated where spring 616 keeps the clamp closed when not activated.

During material transfer from the container to the end-effector, the end-effector may go in low and then rise until it is in position to capture the material. At this point, the clamps on the end-effector may close, capturing the material. Once the material is captured by the clamps on the end-effector, the power coupling may be activated and the clamps on the container may release the material. The end-effector then may rise further, clearing the material from the container clamps, and may proceed to retract. A transfer from the end effector to the container may be achieved by going through the process in reverse.

Although the example container of FIGS. 10(a)-10(c) is depicted with substantially horizontal shelves, the shelves may have any suitable orientation, including a substantially vertical orientation. This configuration may offer the benefit of reduced contamination as particulate matter coming off the top shelves may not contaminate material stored on shelves underneath.

Robotic Manipulator

An example robotic manipulator 700 according to the present invention is depicted diagrammatically in FIGS. 16(a)-16(b). As shown in the figure, the robotic manipulator may include a controller 710, a drive unit 712, a robotic arm 714 and one or more end-effectors 716. The robotic manipulator may be configured to provide at least an adequate number of degrees of freedom to position the end-effector so that it can pick, transfer and place material within the workspace associated with the interface modules and transfer modules described earlier in the document.

In the example of FIGS. 16(a)-16(b), the robotic manipulator features five degrees of freedom, which may be represented, for instance, as x, y and z coordinates of a reference point on the robot end-effector, a yaw angle of the end-effector and a roll angle of the end-effector. In this particular example, the drive unit may include a vertical lift mechanism to control the z-coordinate (elevation) of the end-effector, and may actuate the robotic arm, in this particular example a SCARA-type linkage, to control the x- and y-coordinates and the yaw angle of the end-effector. The robotic arm may feature a flipper arrangement to control the roll angle of the end-effector. Utilizing the flipper, the robotic manipulator may adjust the roll angle of the end-effector to allow the robotic manipulator to pick and place material in various orientations, including a horizontal orientation and a vertical orientation.

When picking (or placing) material, the end-effector may approach the material (or the target material location) from either side. For instance, when picking or placing horizontally oriented material, the end-effector of the robotic manipulator may approach the material from above or from underneath the material.

In order to accommodate different types of material, the robotic arm may be configured to accept different types of end-effectors. In this case, the robotic manipulator may be able to automatically exchange end-effectors. In the end-effector exchange process, the robotic manipulator may move an end-effector that is currently attached to the robotic arm to a designated location, disengage the end-effector, reposition the robotic arm to a location where another end-effector is stored and engage the end-effector.

Although the robotic manipulator in the example of FIG. 6 features a SCARA-type linkage and provides the total of five degrees of freedom, any suitable robotic manipulator with any suitable number and type of linkages and any suitable number of degrees of freedom may be utilized. Similarly, although the robotic manipulator in the example of FIGS. 16(a)-16(b) features distinct controller, drive unit and robotic arm modules, they can be fully or partially integrated with each other in any suitable form. Finally, although the robotic manipulator in the example of FIGS. 16(a)-16(b) is depicted with a single robotic arm and a single end-effector, the robotic manipulator may utilize any suitable number of arms and end-effectors.

End-Effector

The robotic manipulator may feature an end-effector configured to pick, hold and place a material holder, for instance, the example material holder described earlier in the document.

Alternatively, the end-effector may be configured to directly pick, hold and place material in the form of a substantially rectangular sheet, accommodate sheets of various thicknesses and degrees of flexibility, and contact the sheet just at the edges or in limited narrow areas along the edges without touching interior surfaces on either side of the sheet.

Figure 17:
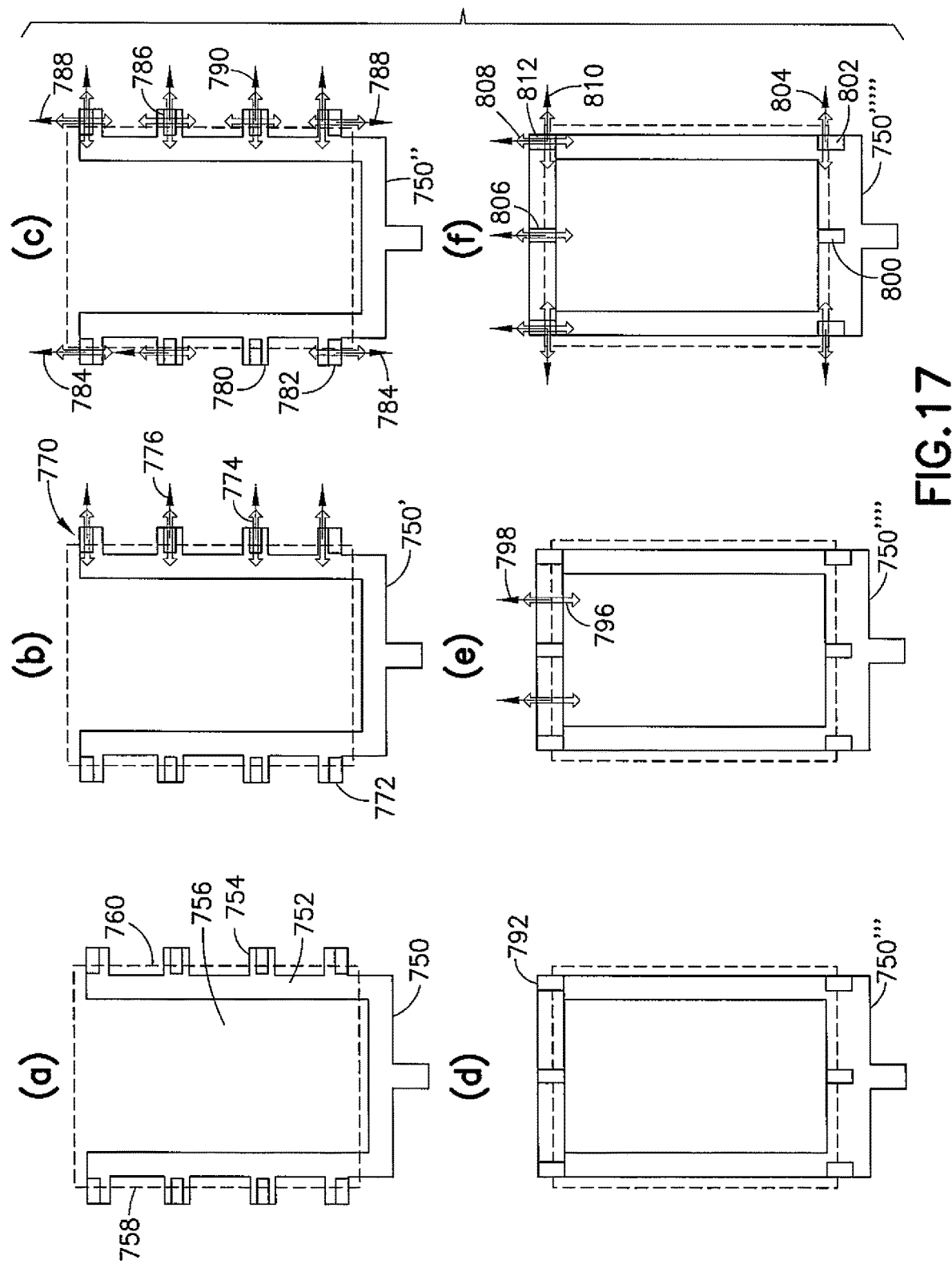
FIGS. 17(*a*)-17(*f*) show top views of an end effector.

In one example embodiment, as depicted diagrammatically in FIG. 17(a), the end-effector 750 may feature a support structure 752 and a clamping mechanism 754 that may secure the sheet 756 along its edges 758, 760 to prevent the sheet from slipping from the support structure.

The clamping mechanism may clamp the sheet continuously along selected edges of the sheet or, alternatively, it may clamp the sheet in discrete locations in order to provide space along the edges of the sheet so that the sheet can be picked and placed, for instance, from and to a carrier. In particular, the discrete locations of the clamps may be selected so that they do not interfere with any support and clamping features of a carrier shelf. The support structure of the end-effector may be shaped to also prevent interference with any support and clamping features of a carrier shelf.

The clamps may be distanced vertically, for example elevated, from the support structure of the end-effector in order to prevent contact of the sheet with the support structure of the end-effector.

The clamps may operate (clamp and unclamp) in a direction substantially normal to the surface of the sheet (in this case, the end-effector may need to approach the sheet in the longitudinal direction, for example so that the end-effector support moves below the sheet and the clamps move above the sheet). Alternatively, the clamps may pivot to the side (this may allow the end-effector to approach the sheet in the normal direction) or perform any suitable motion to engage (clamp the sheet) and disengage (unclamp the sheet).

The clamping mechanism of the end-effector may clamp the sheet from above, which is convenient when the carrier (and other pick and place locations) supports the sheet from underneath. This is because the vertical location where the end-effector comes to contact with the sheet during a pick operation and loses contact with the sheet during a place operation remains consistent regardless of the thickness of the sheet, allowing for simple setup of the robotic manipulator. Alternatively, the clamping mechanism of the end-effector may clamp the sheet from underneath, which may be preferred when the carrier holds the sheet from above. Again, this is convenient because the vertical location where the end-effector comes to contact with the sheet during a pick operation (and loses contact with the sheet during a place operation) remains consistent regardless of the thickness of the sheet.

The clamps of the clamping mechanism may be conveniently implemented in the form of a flexure, thus reducing the risk of particle contamination, which is typically associated with sliding parts, and cost. Example flexures are described earlier in the text with respect to FIGS. 6 and 7 by way of example.

The clamping mechanism may also feature a tensioning arrangement 770 that may exert a predefined force (tension) to the sheet to minimize sagging. As an example, see FIG.

17(b), the end-effector 750' may feature one or more fixed clamps 772 on one side of the support structure and one or more movable clamps 774 on the opposite side of the support structure. The movable clamps may be arranged to apply tensioning force in the direction 776 substantially perpendicular to the edge of the sheet. In the figure, the directions of motion of the movable clamps are indicated by transparent arrows, and the directions of the tensioning forces are indicated by the solid arrows.

As another example, depicted in FIG. 17(c), the end-effector 750" may feature one or more fixed clamps 780 on one side of the support structure and one or more movable clamps 782 on the same side of the support structure. The movable clamps on the same side of the support structure may be arranged to apply tensioning force in the direction 784 substantially parallel with the edge of the sheet. In addition, the end-effector may feature one or more movable clamps 786 on the opposite side of the support structure. Each of the movable clamps on the opposite side of the shelf may be arranged to apply tensioning force in two directions, for instance, in a direction 788 substantially parallel with the edge of the sheet and a direction 790 substantially perpendicular to the sheet. In FIG. 17(c), end effector 750" has stationary clamp 780 and moveable clamps 782, 786 where tension may be applied in directions 784, 788 and 790. The directions of motion of the movable clamps are indicated by transparent arrows, and the directions of the tensioning forces are indicated by the solid arrows.

Alternative configurations of fixed and movable clamps pads are illustrated in FIGS. 17(d) to 17(f). Generally, any suitable arrangement of fixed and movable clamps along any of the edges of the sheet may be utilized to clamp and tension the sheet. In FIG. 17(d), end effector 750''' is shown with clamps 792 on leading and trailing edges of the sheet. In FIG. 17(e), end effector 750'''' is shown with moveable clamps 796 applying tension 798 on the leading edge and stationary clamps 794 on the trailing edge of the sheet of material. In FIG. 17(f), end effector 750''''' is shown with moveable clamps 806, 812 applying tension 808, 810 on the leading edge and stationary clamp 800 and moveable clamps 802 applying tension 804 on the trailing edge of the sheet of material.

In order to pick a sheet from a given location, for instance, a shelf of a carrier, the clamps may be in an open state and, if tensioning arrangement is used, in their nominal locations. The end-effector may then be moved by a robotic manipulator toward the sheet in a direction substantially normal to the surface of the sheet. When contact with the sheet occurs, the clamps may be engaged (closed) and tensioning forces may be applied to hold the sheet in place. In the next step, the sheet may be released, for example unclamped, from its location. Finally, the end-effector may move the sheet away, for example lift the sheet, from its location and transport it from the location.

In order to place a sheet to a given location, for instance, a shelf of a carrier, the end-effector may be moved toward the location in a direction substantially normal to the features that may support the sheet at the location. When contact between the sheet and the location occurs, the location may receive, for example clamp, the sheet. The end-effector clamps may then be disengaged (opened), and the end-effector may be moved away from the surface of the sheet.

The clamps of the end-effector may be operated, for example opened to unclamp the sheet, mechanically, electrically, magnetically, pneumatically, by vacuum or by any other suitable means of actuation, including their combination. The actuation may be provided externally or by actuators built into the robotic manipulator. The clamps may be held closed, for example to keep the sheet clamped, using springs (mechanical, pneumatic or of any other suitable type) or other spring-like arrangements, including flexures.

Similarly, the tensioning arrangement may be operated, for example the clamps may be repositioned to their nominal locations, mechanically, electrically, magnetically, pneumatically, by vacuum or by any other suitable means of actuation, including their combination. The actuation may be provided externally or by actuators built into the robotic manipulator. Tensioning force may be provided using springs (mechanical, pneumatic or of any other suitable type) or using other spring-like arrangements, including flexures.

In another example embodiment, as depicted diagrammatically in FIGS. 18(a)-18(f), the support structure of the end-effector 850 may feature a plurality of vacuum-operated suction pads 852 distributed along the edge 856 of the sheet 854 and configured to produce normal force between the material and the support structure. The normal force between the material and the support structure may result in a frictional force that may prevent the material from slipping from the support structure.

The suction pads may be distanced vertically, for example elevated, from the support structure of the end-effector in order to prevent contact of the sheet with the support structure of the end-effector.

As illustrated in FIG. 18(a), the suction pads may be located in fixed locations on the support structure and activated to hold (grip) the sheet using vacuum. The sheet may be released by removing vacuum from the suction pads and venting them. The release may be accelerated by purging the suction pads, for example by clean dry air or nitrogen.

One or more pressure sensors may be utilized to monitor the pressure in the vacuum line(s) connected to the suction pads and confirm proper grip and release. For instance, a pressure drop below a given threshold may indicate proper grip after activation of the suction pads. Similarly, a pressure rise above a given threshold may confirm proper release after deactivation of the suction pads.

Alternatively, as illustrated in end effector 850' of FIG. 18(b), the suction pads on one side of the support structure may be fixed and the suction pads on the opposing side of the support structure may be movable with respect to the support structure. One or more actuators 860 may be used to apply lateral force(s) 862 between the movable suction pads and the support structure in order to produce a predefined tension in the sheet to minimize its sagging (if the sheet is thin). As an example, a flexure arrangement may be employed to couple each of the movable pads to the support structure, and a vacuum-operated tensioning actuator, such as a bellows, may be utilized to apply a lateral force between each of the movable pads and the support structure.

Figure 18:
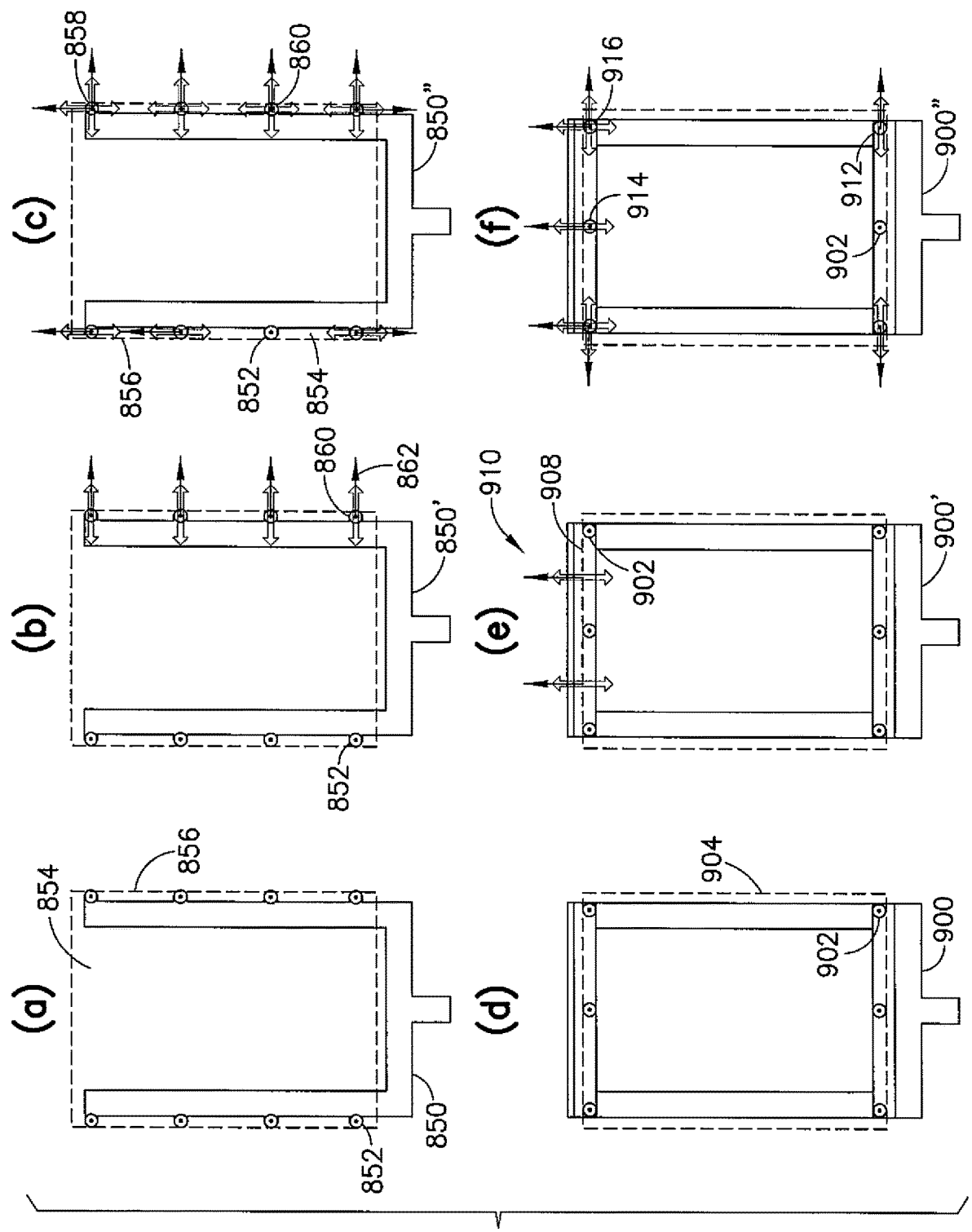
FIGS. 18(*a*)-18(*f*) show top views of an end effector.
Figure 19:
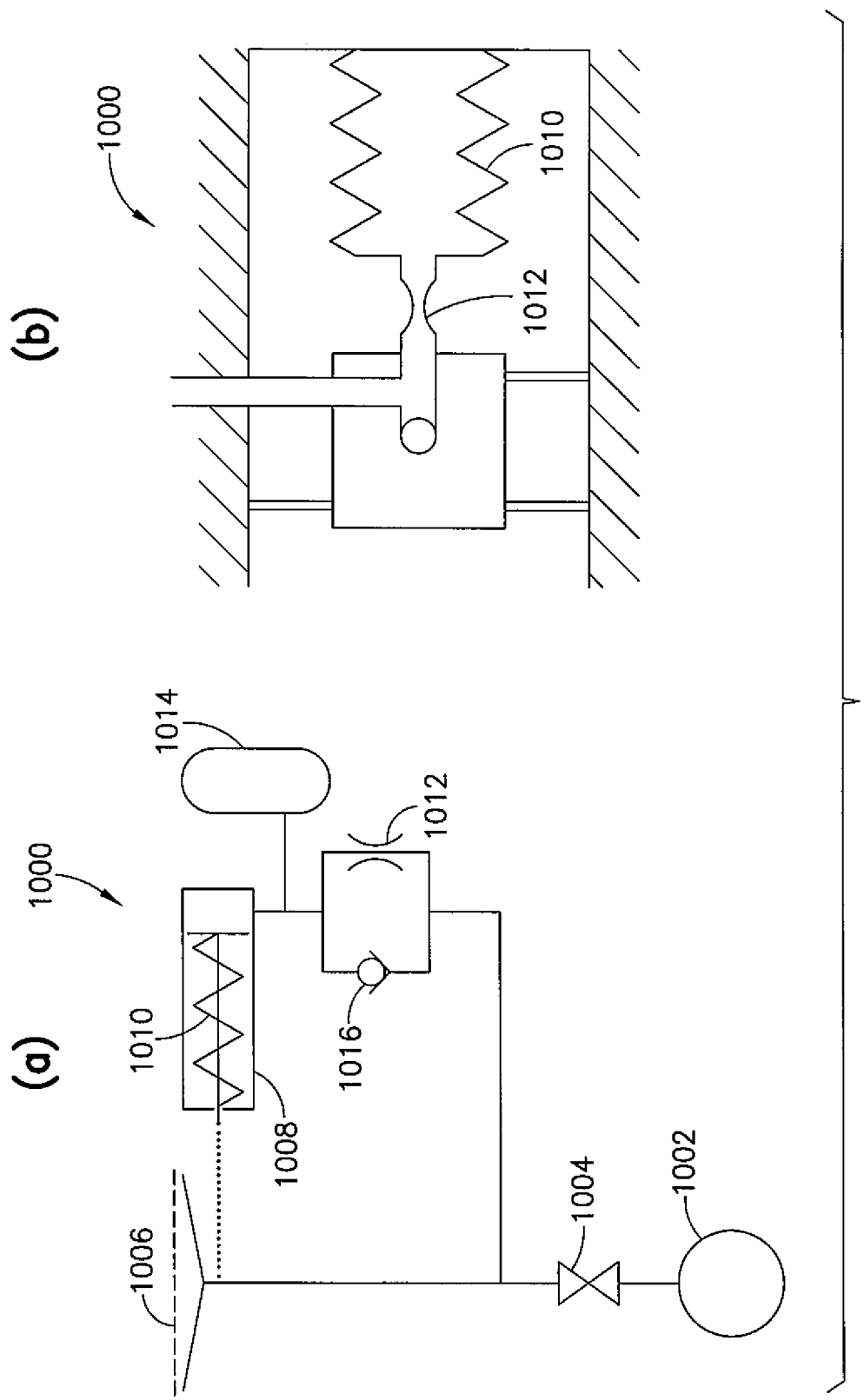
FIGS. 19(*a*)-19(*b*) show a pneumatic circuit.

Alternative configurations of fixed and movable suction pads are illustrated in FIGS. 18(c) to 18(f). Generally, any suitable arrangement of fixed and movable suction pads along any of the edges of the sheet may be utilized to clamp and tension the sheet. In FIG. 18(d), end effector 850" has suction pads 852 on the support structure that may be fixed and suction pads 854, 856, 858 and 860 on the support structure that may be movable with respect to the support structure. One or more actuators may be used to apply lateral force(s) between the movable suction pads and the support structure in order to produce a predefined tension in the sheet to minimize its sagging (if the sheet is thin). In FIG. 18(d), end effector 900 is shown with suction pads 902 on leading and trailing edges of the sheet 904. In FIG. 18(*e*), end effector 900' is shown with moveable suction pads 902 applying tension 910 on the leading edge 908 and stationary suction pads on the trailing edge of the sheet of material. In FIG. 19(*f*), end effector 900" is shown with moveable suction pads 914, 916 applying tension on the leading edge and stationary suction pad 902 and moveable suction pads 912 applying tension on the trailing edge of the sheet of material.

A typical pick operation may include the following steps: 1. The end-effector may be positioned in parallel with the sheet that is to be picked up, for instance, from a shelf; 2. The suction pads may be activated by applying vacuum; 3. The end-effector may be moved in a substantially normal direction toward the surface of the sheet to a position where contact between the vacuum pads and the sheet is established; 4. Proper gripping of the sheet may be confirmed by detecting a pressure drop in the line connected with the suction pads; 5. If applicable, the sheet may be released from its location (for example unclamped from a shelf); 6. The tensioning actuators' may be activated; and 7. The end-effector may be moved away, for example in a substantially normal direction to achieve clearance between the sheet and the shelf.

In one example embodiment, the suction pads and the tensioning actuators may be may be operated independently, for example activated by separate vacuum lines with independent control.

In another example embodiment, the sequencing of the activation of the suction pads may be achieved automatically using a pneumatic circuit 1000, as illustrated schematically in FIG. 19(*a*). The example pneumatic circuit of FIG. 19(*a*) may include a source of vacuum 1002 (for example vacuum pump), a control valve 1004, a suction pad 1006, a vacuum-operated actuator 1008 with a pre-loaded return spring 1010 (tensioning actuator), a flow control orifice 1012, an accumulator 1014 (volume) and an optional check valve 1016. As explained below, the accumulator and the flow control orifice may delay the activation of the tensioning actuator in order for the suction pad to safely grip material before a tensioning force is applied.

Assuming that the control valve is closed and the suction pad is not in contact with the sheet, all of the components of the pneumatic circuit on the suction pad side of the control valve may be at atmospheric pressure. When the suction pad comes to contact with the sheet and the control valve is open, the pressure at the suction pad may drop rapidly, and the suction pad may grip the sheet. At the same time, gas may start to flow slowly through the flow control orifice from the accumulator and pressure may start to gradually decrease in the tensioning actuator. As the pressure in the tensioning actuator gradually decreases, the force applied by the tensioning actuator against the pre-loaded return spring may gradually grow. When the force applied by the tensioning actuator starts to exceed the force of the pre-loaded return spring, the tensioning actuator begins to apply tensioning force.

If the control valve becomes closed and the suction pad gets vented, thus releasing the sheet, gas may start to flow slowly through the flow control orifice to the accumulator (assuming that the optional check valve is not used), pressure in the accumulator and in the tensioning actuator may start to gradually increase, and the tensioning force may be gradually reduced. If the optional check valve is used, gas may flow freely to the accumulator and the force produced by the tensioning actuator may drop rapidly, which may facilitate desirably quick material release during a place operation.

The pneumatic circuit may be conveniently incorporated directly into the support structure of the end-effector, as depicted diagrammatically in the example of in FIG. 19(*b*)

A more sophisticated version of the pneumatic circuit of FIGS. 19(*a*) and 19(*b*) may be used to program additional behavior directly into the end-effector.

Figure 20:
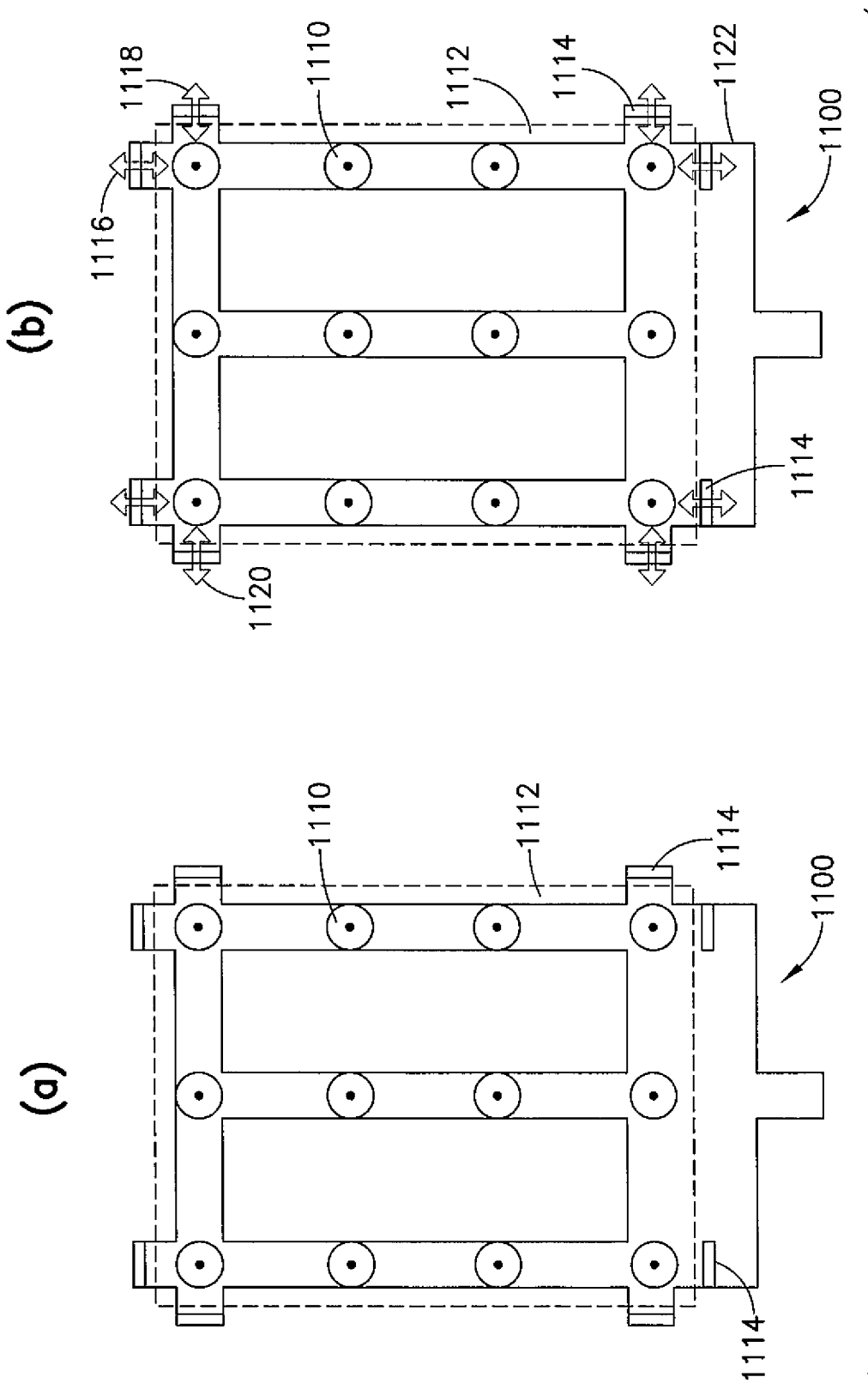
FIGS. 20(*a*)-20(*b*) show top views of an end effector.

In yet another example embodiment, as depicted diagrammatically in FIGS. 20(*a*)-20(*b*), the support structure of the end-effector 1100 may feature a plurality of Bernoulli-effect pads 1110 distributed along the surface of the sheet 1112 and configured to hold the sheet without contact at a substantially constant normal distance using a flow of gas.

Each of the Bernoulli-effect pads may include a surface substantially parallel with the surface of the sheet and an orifice connected to a controlled supply of a pressurized gas, such as clean dry air, nitrogen or any other suitable gas. The size of the orifice and the gas supply may be configured so that the speed of the gas increases as it exits the orifice of the Bernoulli-effect pad and travels through a gap between the surface of the Bernoulli-effect pad and the sheet held by the end-effector. The increase in the speed of the gas may create a region of reduced pressure between the surface of the Bernoulli-effect pad and the surface of the sheet, which in turn may produce a normal force between the Bernoulli-effect pad and the sheet. This allows the end-effector to lift the sheet and hold it from above.

The surface of each of the Bernoulli-effect pads may be shaped to improve the flow of the gas between the surface of the Bernoulli-effect pad and the surface of the sheet. For instance, the surface of the Bernoulli-effect pad may feature shaped grooves leading from the orifice of the Bernoulli-effect pad to the circumference of the Bernoulli-effect pad.

As illustrated in FIGS. 20(*a*)-20(*b*), the support structure of the end-effector may further include hard-stops 1114 located in the proximity of the edges of the sheet to prevent the sheet from moving in the lateral and longitudinal directions. The hard-stops may be fixed with respect to the support structure of the end-effector (FIG. 20(*a*)).

Alternatively, some or all of the hard-stops may be movable in directions 1116, 1118, 1120, 1122 substantially normal to the edges of the sheet (FIG. 20(*b*)). Prior to a pick operation, the movable hard-stops may be moved outward (opened) to allow for a misalignment of a sheet and, when the sheet is gripped by the Bernoulli-effect pads, the movable hard-stops may be moved inward (closed) to align the sheet with the expected nominal location of the sheet. Similarly, after placing the sheet, the movable hard-stops may be moved outward (opened) to avoid contact with the edges of the sheet as the end-effector moves away from the sheet.

A typical pick operation may include the following steps: 1. The end-effector may be positioned in parallel with the sheet that is to be picked up, for instance, from a shelf, with the movable hard-stops open; 2. The end-effector may be moved toward the sheet to a specified normal distance from the surface of the sheet; 3. The Bernoulli-effect pads may be activated by applying pressurized gas; 4. If applicable, the sheet may be released from its location (for example unclamped from a shelf); 5. The movable hard-stops may be closed; and 6. The end-effector may be moved away, for example in a substantially normal direction to achieve clearance between the sheet and the shelf.

Figure 21:
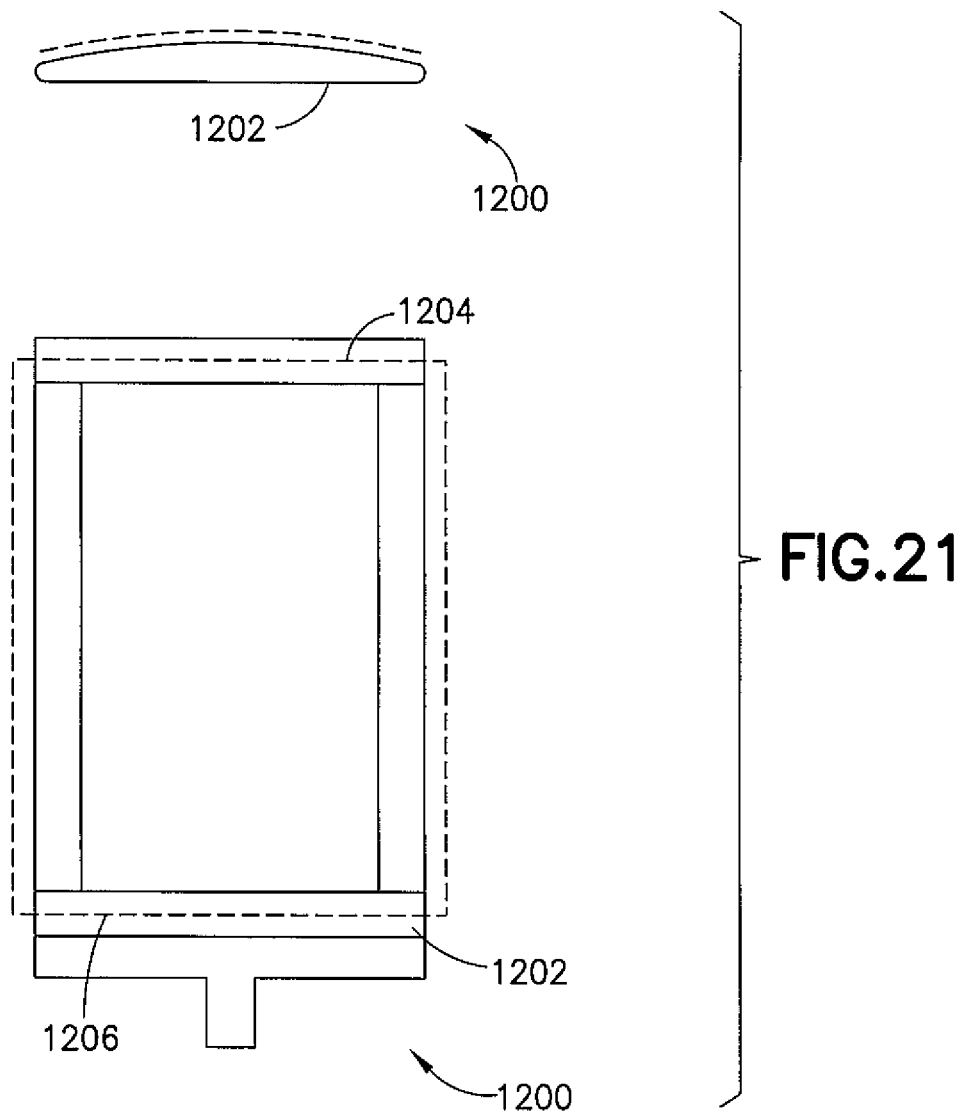
FIG. 21 shows front and top views of an end effector.

Another example embodiment of the end-effector 1200 according to the present invention is depicted diagrammatically in FIG. 21 (the figure shows the side view of the end-effector and the top view of the end-effector). In this example embodiment, the support structure 1202 of the end-effector may feature two curved sections configured to contact and support a thin, flexible sheet along two of its edges 1204, 1206. The sheet may comply with the contour of the curved sections, for example due to gravity force, which may prevent the sheet from sagging.

The sheet may passively rest on the curved sections of the support structure of the end-effector and may be prevented from slipping by hard-stops located along the edges of the sheet. Alternatively, the sheet may be gripped along the other two substantially straight edges of the sheet using mechanical clamps, suction pads or any other suitable arrangement.

While the above example embodiments are described primarily for material in the form of substantially rectangular sheets, it should be noted that the material may be of other geometric forms, including, but not limited to, circular, oval or trapezoidal shapes.

In accordance with one aspect of an example embodiment, an apparatus is provide comprising a frame; and a plurality of clamps connected to the frame, where at least one of the clamps is movable to releasably clamp a sheet of material on the apparatus, where the plurality of clamps are configured and located on the frame to be limited to clamp on the sheet of material at least two edges of the sheet of material.

In accordance with another aspect of an example embodiment, at least one of the plurality of clamps is sized, shaped and located on the frame to be located continuously along one of the edges of the sheet of material.

In accordance with another aspect of an example embodiment, at least two of the plurality of clamps are sized, shaped and located on the frame to be located at discrete locations at one of the edges of the sheet of material.

In accordance with another aspect of an example embodiment, at least one of the plurality of clamps comprises a flexure clamp configured to flex between an open unclamped position and a closed clamped position.

In accordance with another aspect of an example embodiment, the flexure clamp is configured to provide a bi-stable behavior between the open unclamped position and the closed clamped position.

In accordance with another aspect of an example embodiment, the apparatus further comprises at least one actuator configured to move at least one of the plurality of clamps between an open unclamped position and a closed clamped position.

In accordance with another aspect of an example embodiment, the at least one actuator is configured to apply a bi-directional actuation force.

In accordance with another aspect of an example embodiment, the plurality of clamps are configured to apply a tensioning force to the sheet of material between at least two of the plurality of clamps.

In accordance with another aspect of an example embodiment, at least one of the clamps comprises a cam on a rotating shaft.

In accordance with another aspect of an example embodiment, at least one of the clamps comprises one or more smart materials configured to change shape and size upon an application of an electric voltage, a thermal input, an electric fields, and/or a magnetic fields.

In accordance with another aspect of an example embodiment, the smart material(s) comprise at least one of: a piezoelectric material, a shape memory polymer, a magneto-strictive material, and a dielectric-elastomer.

In accordance with another aspect of an example embodiment, the frame comprises at least one of: an electroactive polymer, a piezoelectric material, a shape memory polymer, a magneto-strictive material and a dielectric-elastomer.

An apparatus as in claim 1 where the frame forms at least part of a robotic end effector or a storage container for a plurality of the sheet of material.

In accordance with another aspect of an example embodiment, a storage container comprises an enclosure comprising a plurality of shelves inside the enclosure configured to individually support sheets of material thereon; and a plurality of clamps located at the plurality of shelves, where at least some of the plurality of clamps are movable relative to the shelves to clamp the sheets of material respectively at the shelves, and where the plurality of clamps are configured and located on the enclosure to be limited to clamp on the sheet of material at least two edges of the sheet of material.

In accordance with another aspect of an example embodiment, at least one of the plurality of clamps comprises a flexure clamp configured to flex between an open unclamped position and a closed clamped position.

In accordance with another aspect of an example embodiment, the flexure clamp is configured to provide a bi-stable behavior between the open unclamped position and the closed clamped position.

In accordance with another aspect of an example embodiment, the storage container further comprises at least one actuator configured to move at least one of the plurality of clamps between an open unclamped position and a closed clamped position.

In accordance with another aspect of an example embodiment, the at least one actuator is configured to apply a bi-directional actuation force.

In accordance with another aspect of an example embodiment, the at least one actuator is configured to be vacuum actuated.

In accordance with another aspect of an example embodiment, the at least one actuator is configured to be actuated by a magnetic field.

In accordance with another aspect of an example embodiment, the plurality of clamps are configured to apply a tensioning force to the sheet of material between at least two of the plurality of clamps.

In accordance with another aspect of an example embodiment, at least one of the clamps comprises a cam on a rotating shaft.

In accordance with another aspect of an example embodiment, at least one of the clamps comprises one or more smart materials configured to change shape and size upon an application of an electric voltage, a thermal input, an electric fields, and/or a magnetic fields.

In accordance with another aspect of an example embodiment, an end effector comprises a frame configured to support a sheet of material thereon, where the frame is configured to be connected to an arm of a robotic manipulator; and a holding system configured to hold the sheet of material on the frame, where the holding system comprises at least one of a clamp to be limited to clamp on the sheet of material at a side edge of the sheet of material and a vacuum-operated suction pad movably located on the frame, where the holding system is configured to apply a tension on the sheet of material.

It should be understood that the foregoing description is only illustrative. Various alternatives and modifications can be devised by those skilled in the art. For example features recited in the various dependent claims could be combined with each other in any suitable combination(s). In addition, features from different embodiments described above could be selectively combined into a new embodiment. Accordingly, the description is intended to embrace all such alternatives, modifications and variances.

What is claimed is:

1. An apparatus comprising:
a frame; and
a plurality of clamps connected to the frame, where at least one of the clamps is movable to releasably clamp a sheet of material on the apparatus, where the plurality of clamps are configured and located on the frame to be limited to clamp on the sheet of material at edges of the sheet of material, where the plurality of clamps are configured to apply a tensioning force to the sheet of material between at least two of the clamps, where the at least two clamps are located at opposite ones of the edges of the sheet of material.

2. An apparatus as in claim 1 where at least one of the plurality of clamps is sized, shaped and located on the frame to be located continuously along one of the edges of the sheet of material.

3. An apparatus as in claim 1 where at least two of the plurality of clamps are sized, shaped and located on the frame to be located at discrete locations at one of the edges of the sheet of material.

4. An apparatus as in claim 1 where at least one of the plurality of clamps comprises a flexure clamp configured to flex between an open unclamped position and a closed clamped position.

5. An apparatus as in claim 4 where the flexure clamp is configured to provide a bi-stable behavior between the open unclamped position and the closed clamped position.

6. An apparatus as in claim 1 further comprising at least one actuator configured to move at least one of the plurality of clamps between an open unclamped position and a closed clamped position.

7. An apparatus as in claim 6 where the at least one actuator is configured to apply a bi-directional actuation force.

8. An apparatus as in claim 1 where at least one of the clamps comprises a cam on a rotating shaft.

9. An apparatus as in claim 1 where at least one of the clamps comprises one or more smart materials configured to change shape and size upon an application of an electric voltage, a thermal input, an electric fields, and/or a magnetic fields.

10. An apparatus as in claim 9 where the smart material(s) comprise at least one of: a piezoelectric material, a shape memory polymer, a magneto-strictive material, and a dielectric-elastomer.

11. An apparatus as in claim 1 where the frame comprises at least one of: an electroactive polymer, a piezoelectric material, a shape memory polymer, a magneto-strictive material and a dielectric-elastomer.

12. An apparatus as in claim 1 where the frame forms at least part of a robotic end effector.

13. An apparatus as in claim 1 where the frame forms at least part of a storage container for a plurality of the sheet of material.

14. A storage container comprising:
an enclosure comprising a plurality of shelves inside the enclosure configured to individually support sheets of material thereon; and
a plurality of clamps located at the plurality of shelves, where at least some of the plurality of clamps are movable relative to the shelves to clamp the sheets of material respectively at the shelves, and where the plurality of clamps are configured and located on the enclosure to be limited to clamp on the sheet of material at edges of the sheet of material, where the plurality of clamps are configured to apply a tensioning force to the sheet of material between at least two of the clamps, where the at least two clamps are located at opposite ones of the edges of the sheet of material.

15. A storage container as in claim 14 where at least one of the plurality of clamps comprises a flexure clamp configured to flex between an open unclamped position and a closed clamped position.

16. A storage container as in claim 15 where the flexure clamp is configured to provide a bi-stable behavior between the open unclamped position and the closed clamped position.

17. A storage container as in claim 14 further comprising at least one actuator configured to move at least one of the plurality of clamps between an open unclamped position and a closed clamped position.

18. A storage container as in claim 17 where the at least one actuator is configured to apply a bi-directional actuation force.

19. A storage container as in claim 17 where the at least one actuator is configured to be vacuum actuated.

20. A storage container as in claim 17 where the at least one actuator is configured to be actuated by a magnetic field.

21. A storage container as in claim 14 where at least one of the clamps comprises a cam on a rotating shaft.

22. A storage container as in claim 14 where at least one of the clamps comprises one or more smart materials configured to change shape and size upon an application of an electric voltage, a thermal input, an electric fields, and/or a magnetic fields.

23. An end effector comprising:
a frame configured to support a sheet of material thereon, where the frame is configured to be connected to an arm of a robotic manipulator; and
a holding system configured to hold the sheet of material on the frame, where the holding system comprises at least one clamp limited to clamp on the sheet of material at a side edge of the sheet of material and a vacuum-operated suction pad movably located on the frame, where the vacuum-operated suction pad and/or the at least one clamp are configured to move relative to one another, where the holding system is configured to apply a tension on the sheet of material from the side edge of the sheet of material.

* * * * *